(12) United States Patent
Diorio et al.

(10) Patent No.: US 11,017,349 B1
(45) Date of Patent: May 25, 2021

(54) RFID LOSS-PREVENTION BASED ON TRANSITION RISK

(71) Applicant: Impinj, Inc., Seattle, WA (US)

(72) Inventors: Christopher J. Diorio, Shoreline, WA (US); Alberto Pesavento, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/728,480

(22) Filed: Dec. 27, 2019

Related U.S. Application Data

(63) Continuation of application No. 16/455,792, filed on Jun. 28, 2019, now Pat. No. 10,521,768, which is a continuation of application No. 15/811,554, filed on Nov. 13, 2017, now Pat. No. 10,373,115, which is a continuation of application No. 15/372,458, filed on Dec. 8, 2016, now Pat. No. 9,818,084.

(60) Provisional application No. 62/265,189, filed on Dec. 9, 2015.

(51) Int. Cl.
| | |
|---|---|
| *G06Q 10/08* | (2012.01) |
| *G06K 19/07* | (2006.01) |
| *G06K 7/10* | (2006.01) |
| *G06K 19/077* | (2006.01) |
| *G08B 13/24* | (2006.01) |

(52) U.S. Cl.
CPC ....... *G06Q 10/087* (2013.01); *G06K 7/10297* (2013.01); *G06K 19/0705* (2013.01); *G06K 19/07749* (2013.01); *G08B 13/2485* (2013.01)

(58) Field of Classification Search
CPC .................................................. G06Q 10/087
See application file for complete search history.

(56) References Cited

U.S. PATENT DOCUMENTS

| | | | |
|---|---|---|---|
| 9,818,084 B1 * | 11/2017 | Diorio | G06K 19/07749 |
| 10,878,685 B1 * | 12/2020 | Diorio | G08B 21/182 |
| 2007/0285241 A1 * | 12/2007 | Griebenow | G06Q 10/08 340/572.1 |
| 2014/0197952 A1 | 7/2014 | Parker et al. | |
| 2017/0046707 A1 * | 2/2017 | Krause | G06Q 20/4016 |

* cited by examiner

*Primary Examiner* — Travis R Hunnings
(74) *Attorney, Agent, or Firm* — Hertzberg, Turk & Associates, LLC

(57) ABSTRACT

An RFID loss-prevention system (LPS) may monitor RFID-tagged items in a facility. An RFID reader transmits a first inventory command configured to cause tags in a first state to respond, receive a reply from a first tag, determine that the first tag has a low transition risk, and cause the first tag to switch to a second state. The reader may also receive a reply from a second tag, determine that the second tag has a high transition risk, and cause the second tag to remain in the first state. The reader may then transmit a second inventory command configured to cause tags in the first state to respond, receive a reply from the second tag in response to the second inventory command, determine that the second tag has inappropriately exited the facility, and issue an alert.

20 Claims, 15 Drawing Sheets

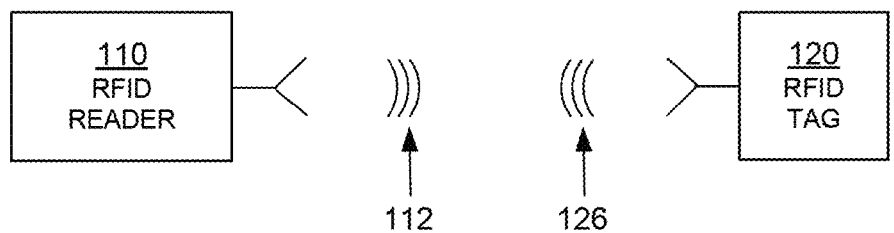
FIG. 1
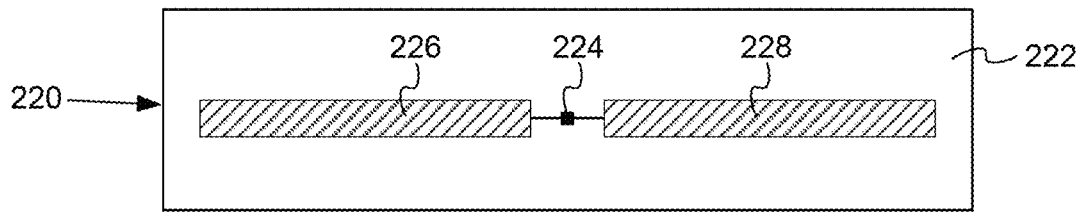
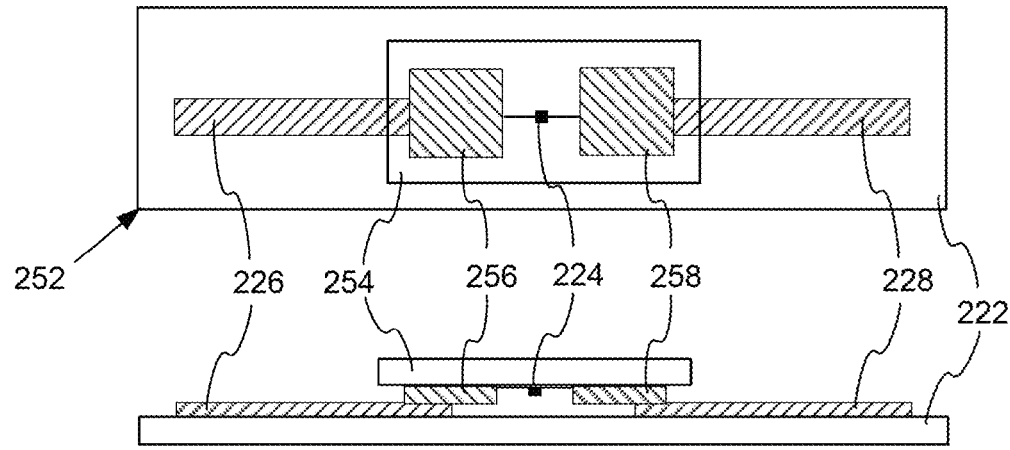
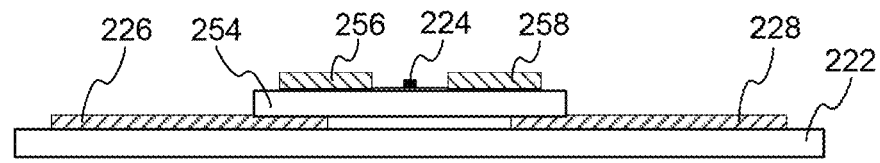
FIG. 2

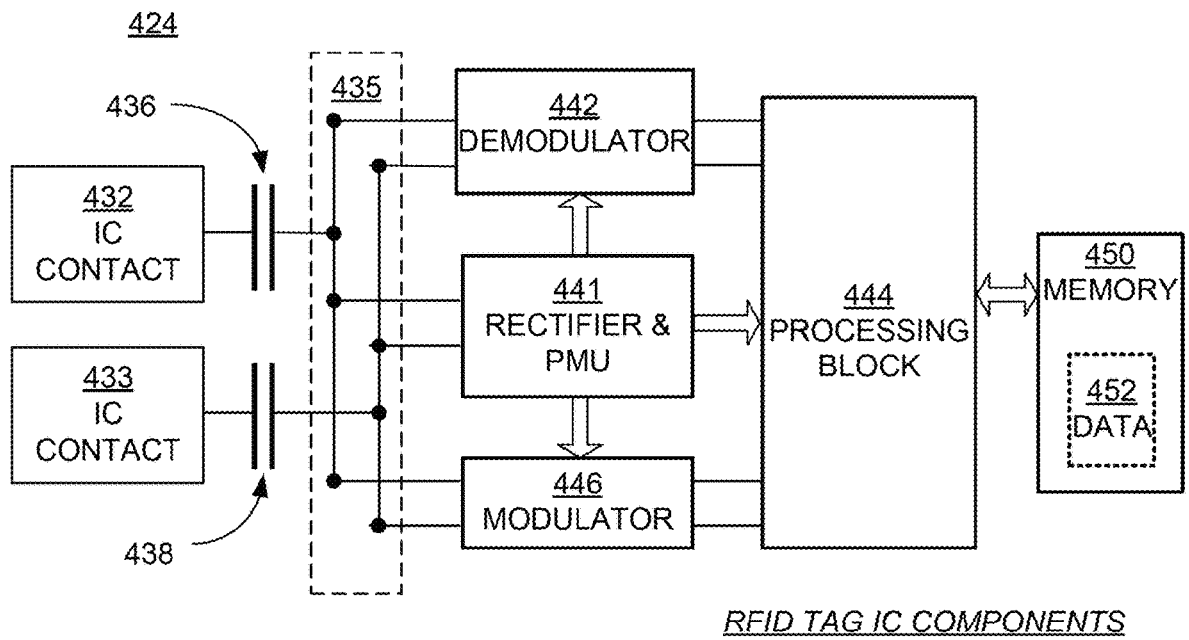
FIG. 4
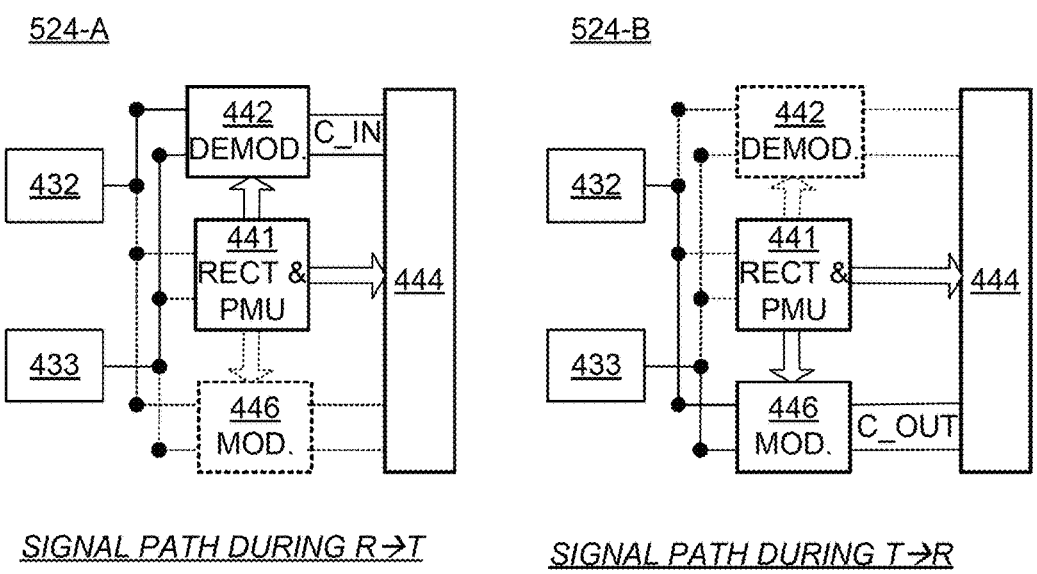
FIG. 5A  FIG. 5B

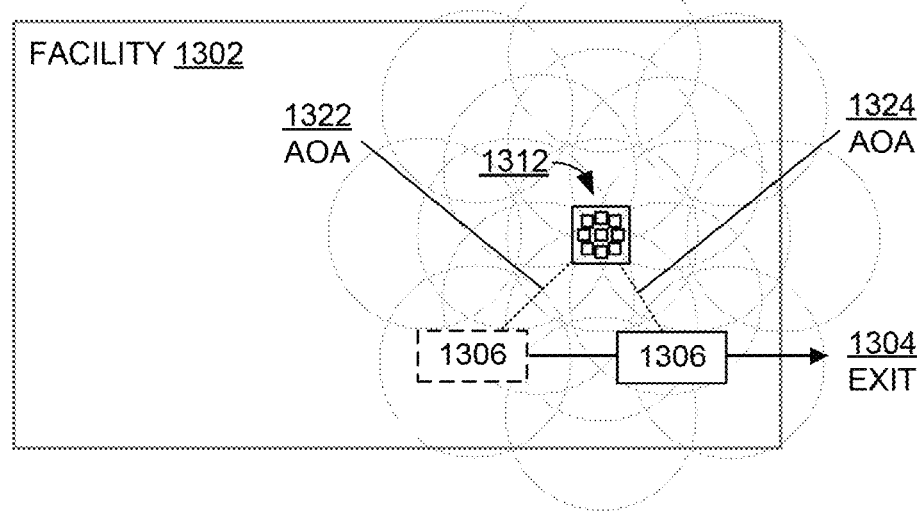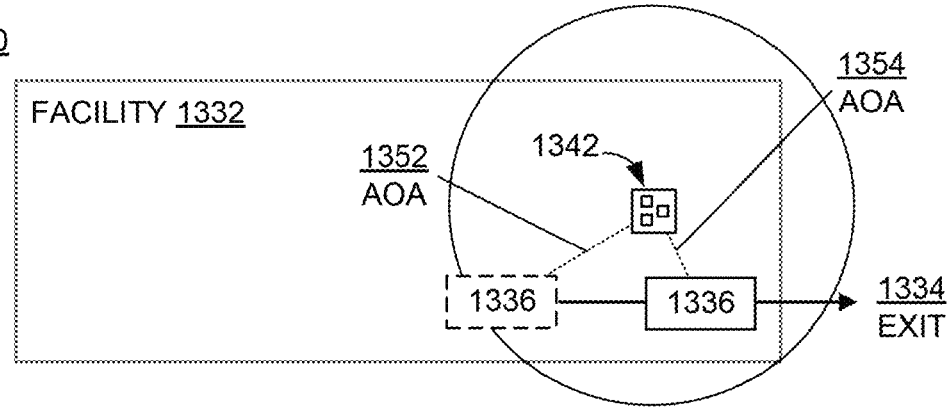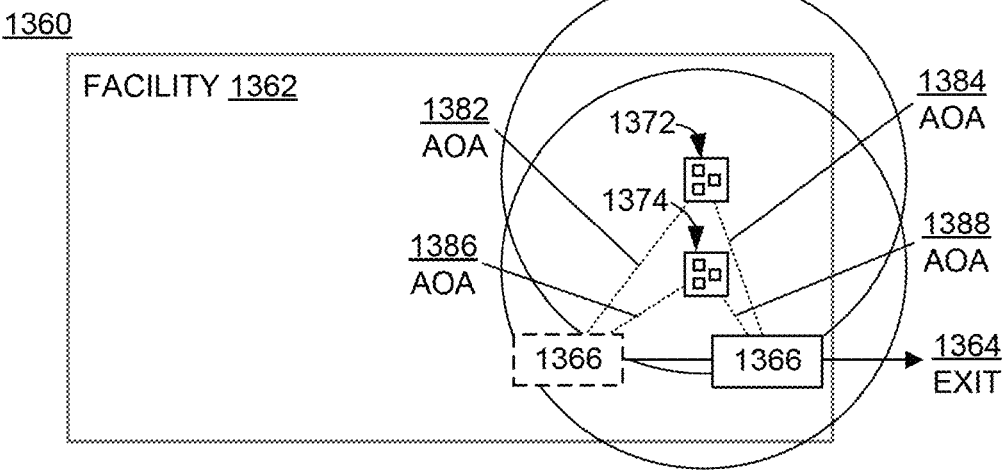
FIG. 13

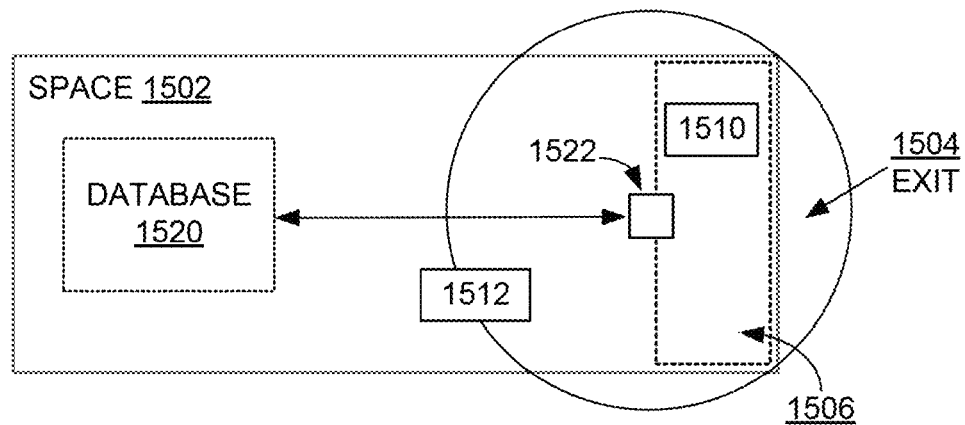
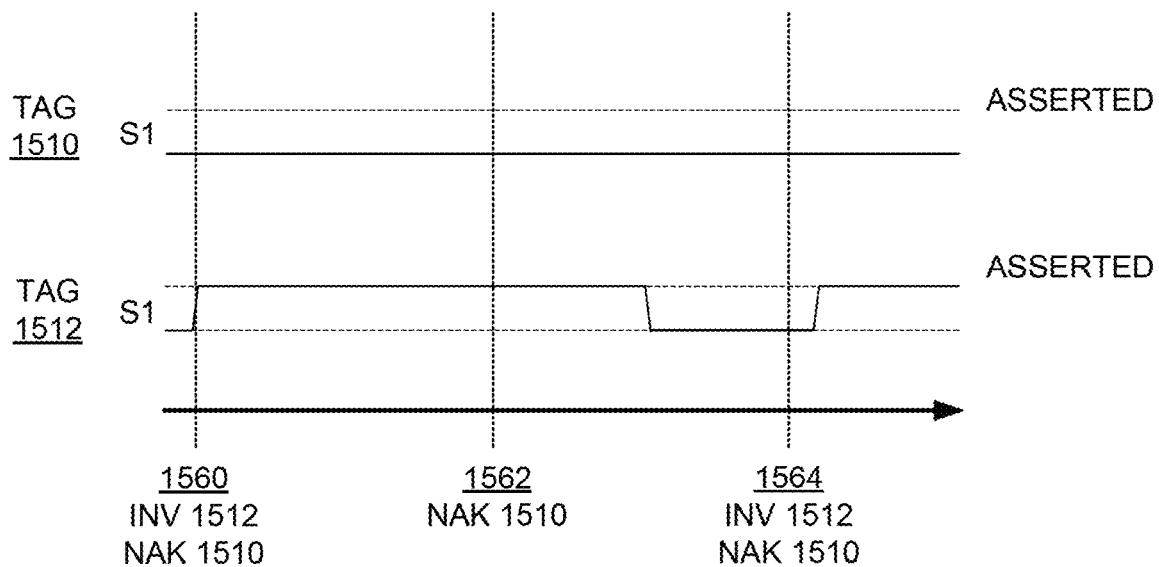
FIG. 15

RFID LOSS-PREVENTION BASED ON TRANSITION RISK

CROSS REFERENCE TO RELATED APPLICATIONS

This Application is a continuation under 35 U.S.C. § 120 of U.S. patent application Ser. No. 16/455,792 filed on Jun. 28, 2019, now U.S. Pat. No. 10,521,768, which is a continuation under 35 U.S.C. § 120 of U.S. patent application Ser. No. 15/811,554, now U.S. Pat. No. 10,373,115, filed on Nov. 13, 2017, which is a continuation under 35 U.S.C. § 120 of U.S. patent application Ser. No. 15/372,458, now U.S. Pat. No. 9,818,084, filed on Dec. 8, 2016, which claim the benefit of U.S. Provisional Application Ser. No. 62/265,189 filed on Dec. 9, 2015. The U.S. Patent Application and the U.S. Provisional Application are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave (alternately referred to as an "RF signal") performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (an inventory command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

RFID technology may be employed in loss-prevention systems used, for example, by retailers. In one approach, a database maintains information about items in the store. Checkout readers authorize an item to leave the store after a consumer pays for the item, and then provide this authorization information to the database and/or a tag associated with the item. Point-of-exit readers read tagged items exiting the store and check the database and/or the tag to determine if the item is authorized to leave.

Embodiments are directed to monitoring RFID-tagged items for unauthorized transitions from a facility. An RFID reader may transmit a first inventory command configured to cause tags in a first state to participate in an inventory round, receive a first reply from a first tag in the inventory round, determine that a first item associated with the first tag has a low transition risk, and cause the first tag to switch to a second state based on the low transition risk. The reader may also receive a second reply from a second tag in the first inventory round, determine that a second item associated with the second tag has a high transition risk, and cause the second tag to remain in the first state based on the high transition risk. The reader may then transmit a second inventory command configured to cause tags in the first state to participate in a second inventory round, receive a third reply from the second tag in the second inventory round, determine that the second item has inappropriately exited the facility, and issue an alert.

According to some examples, a method for monitoring RFID-tagged items in a facility is provided. The method may include transmitting a first inventory command configured to cause tags in a first state to participate in a first inventory round, receiving a first reply from a first tag in the first inventory round, determining that a first item associated with the first tag has a low transition risk based on the first reply, and causing the first tag to switch to a second state based on the low transition risk. The method may further include receiving a second reply from a second tag in the first inventory round, determining that a second item associated with the second tag has a high transition risk based on the second reply, and causing the second tag to remain in the first state based on the high transition risk. The method may further include transmitting a second inventory command configured to cause tags in the first state to participate in a second inventory round, receiving a third reply from the second tag in the second inventory round, determining that the second item has inappropriately left the facility based on the third reply, and issuing an alert.

According to other examples, a method for a synthesized-beam radio-frequency identification (RFID) reader (SBR) to monitor RFID-tagged items in a facility is provided. The method may include synthesizing a first beam directed substantially into the facility, transmitting a first inventory command on the first beam configured to cause tags in a first state to participate in a first inventory round, receiving a first reply from a first tag in the first inventory round, determining that a first item associated with the first tag has a low transition risk based on the first reply, and causing the first tag to switch to a second state based on the low transition risk. The method may further include receiving a second reply from a second tag in the first inventory round, determining that a second item associated with the second tag has a high transition risk based on the second reply, and causing the second tag to remain in the first state based on the high transition risk. The method may further include synthesizing a second beam directed substantially outside the facility, transmitting a second inventory command on the second beam configured to cause tags in the first state to participate in a second inventory round, receiving a third reply from the second tag in the second inventory round, determining that the second item has inappropriately left the facility based on the third reply, and issuing an alert.

According to further examples, a method for a radio-frequency identification (RFID) reader system including multiple antennas to monitor RFID-tagged items in a facility is provided. The method may include directing a first beam substantially into the facility from a first antenna, transmitting a first inventory command on the first beam configured to cause tags in a first state to participate in a first inventory round, receiving a first reply from a first tag in the first inventory round, determining that a first item associated with the first tag has a low transition risk based on the first reply, and causing the first tag to switch to a second state based on the low transition risk. The method may further include receiving a second reply from a second tag in the first inventory round, determining that a second item associated with the second tag has a high transition risk based on the second reply, and causing the second tag to remain in the first state based on the high transition risk. The method may further include directing a second beam substantially outside the facility from a second antenna, transmitting a second inventory command on the second beam configured to cause tags in the first state to participate in a second inventory round, receiving a third reply from the second tag in the second inventory round, determining that the second item has inappropriately left the facility based on the third reply, and issuing an alert.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 13 depicts several examples of how angle-of-arrival may be used to determine the direction and/or velocity of a moving tag.

FIG. 15 depicts how RFID readers may be used to monitor tagged items at particular risk of theft, according to embodiments.

DETAILED DESCRIPTION

Figure 3:
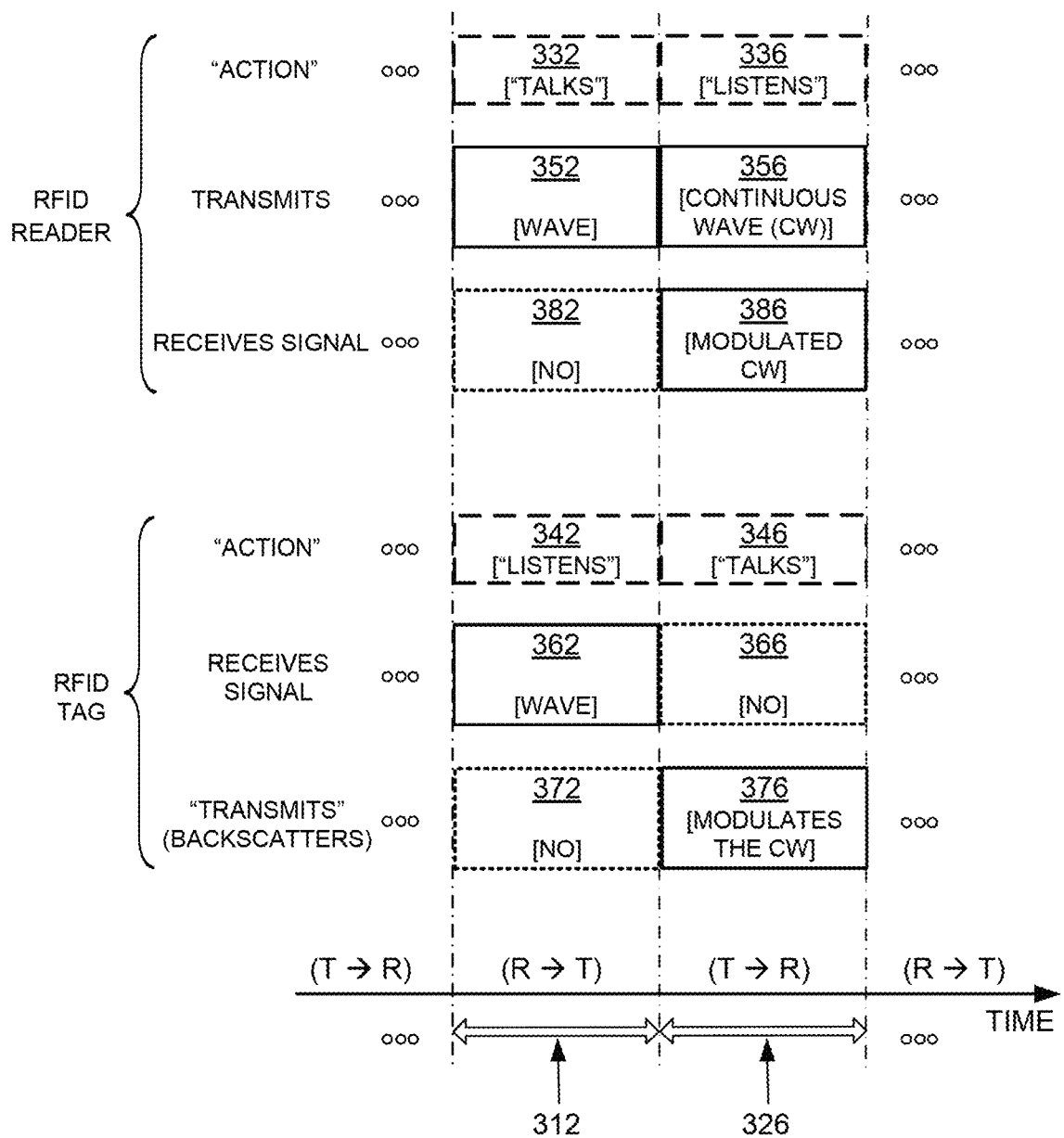
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
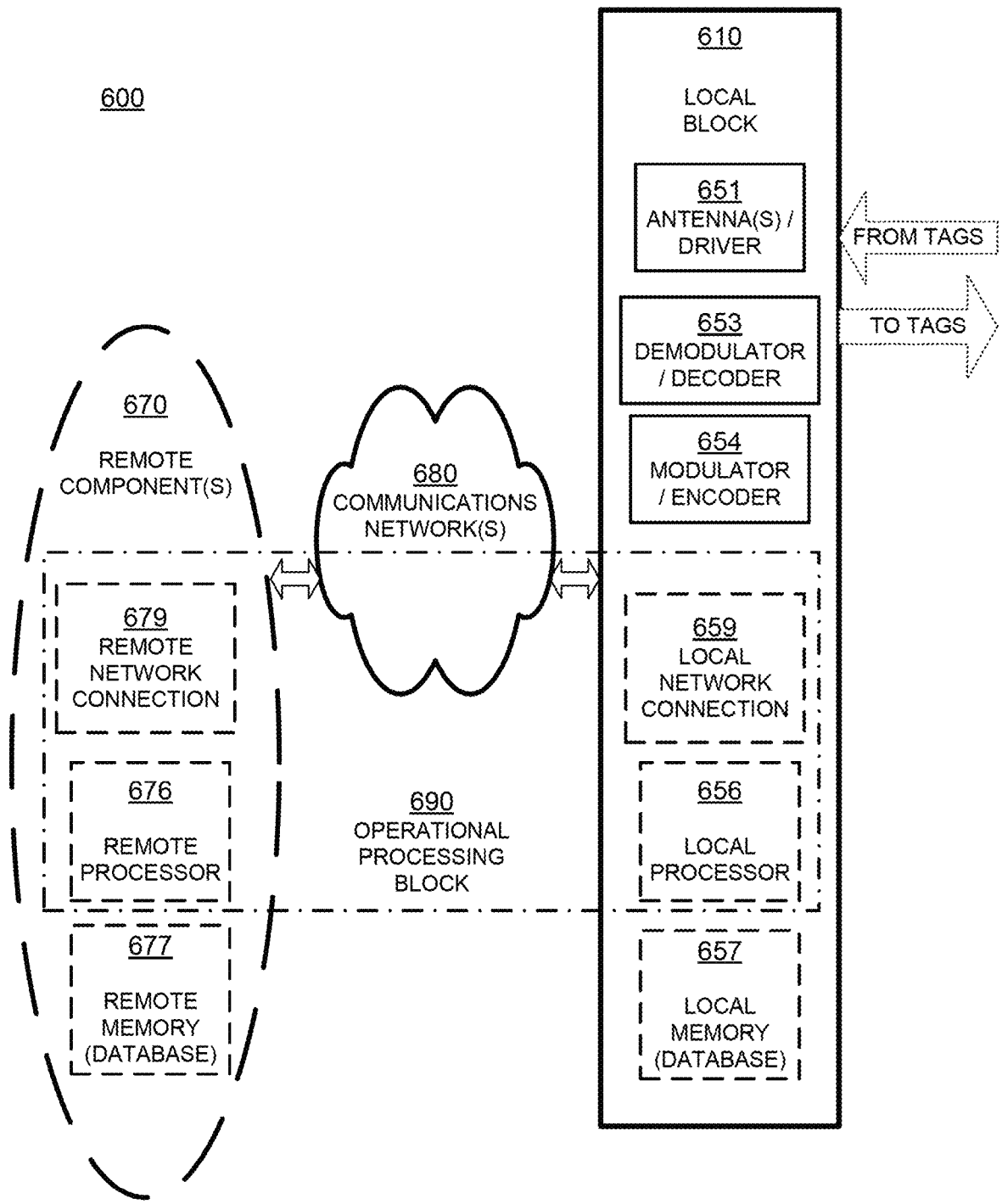
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), described in more detail below, and local block 610 may be implemented in a synthesized-beam reader (SBR) configured to generate one or more beams via the SBA. A demodulator/decoder block 653 demodulates and decodes backscattered waves received from the tags via antenna/driver block 651.

Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are indeed provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined together and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

An RFID reader system such as the reader system 600 may interact with RFID tags by selecting, inventorying, and accessing the tags. An RFID reader may select tags by transmitting a selection command that causes specified tags to reply. In the Gen2 Specification, selection commands include the Select command and the Challenge command. After selection, or if no selection needs to be done, a reader may inventory the tag population to retrieve identifiers for individual tags within the population. The reader inventories individual tags using inventory commands that cause the tag being inventoried to respond with an identifier at an appropriate time. For example, inventory commands include the Query, QueryAdjust, QueryRep, ACK, and NAK commands of the Gen2 Specification, and may include any other command that causes a receiving tag to respond with an identifier and/or determine whether it should respond with an identifier. During the inventory process, the reader may further access or interact with particular tags using access commands. For example, the Gen2 Specification provides commands to read or write data to a tag, adjust restrictions associated with the tag, securely communicate with the tag, or perform a number of other actions, further specified in the Gen2 Specification.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 7:
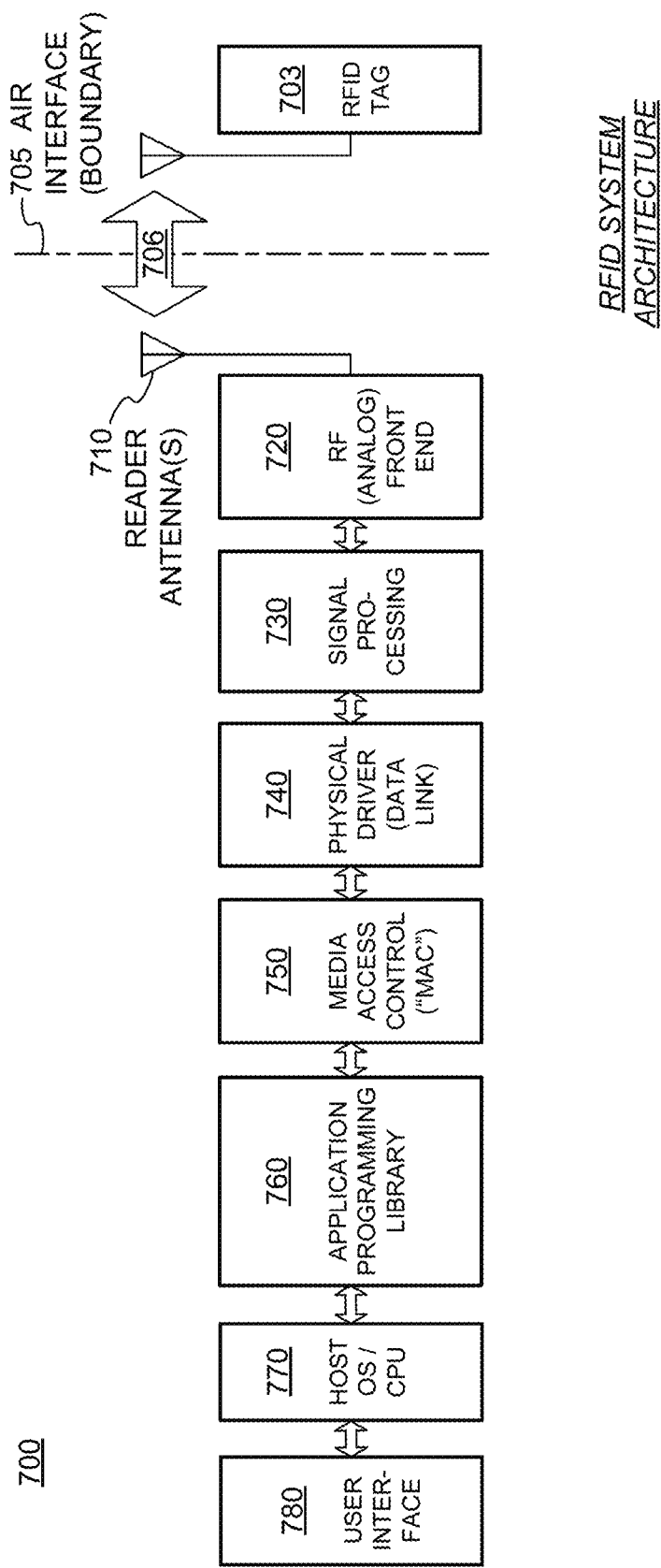
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 further includes a physical-driver module 740, which is also known as a data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them. In some embodiments RFID system 700 can be incorporated into another electronic device such as a checkout terminal in a store or a consumer device such as a mobile phone.

Everything described above in terms of readers and reader components finds some correspondence with tags and tag ICs, and vice versa. Numerous details have been set forth in this description, which is to be taken as a whole, to provide a more thorough understanding of the invention. In other instances, well-known features have not been described in detail, so as to not obscure unnecessarily the invention.

Figure 8:
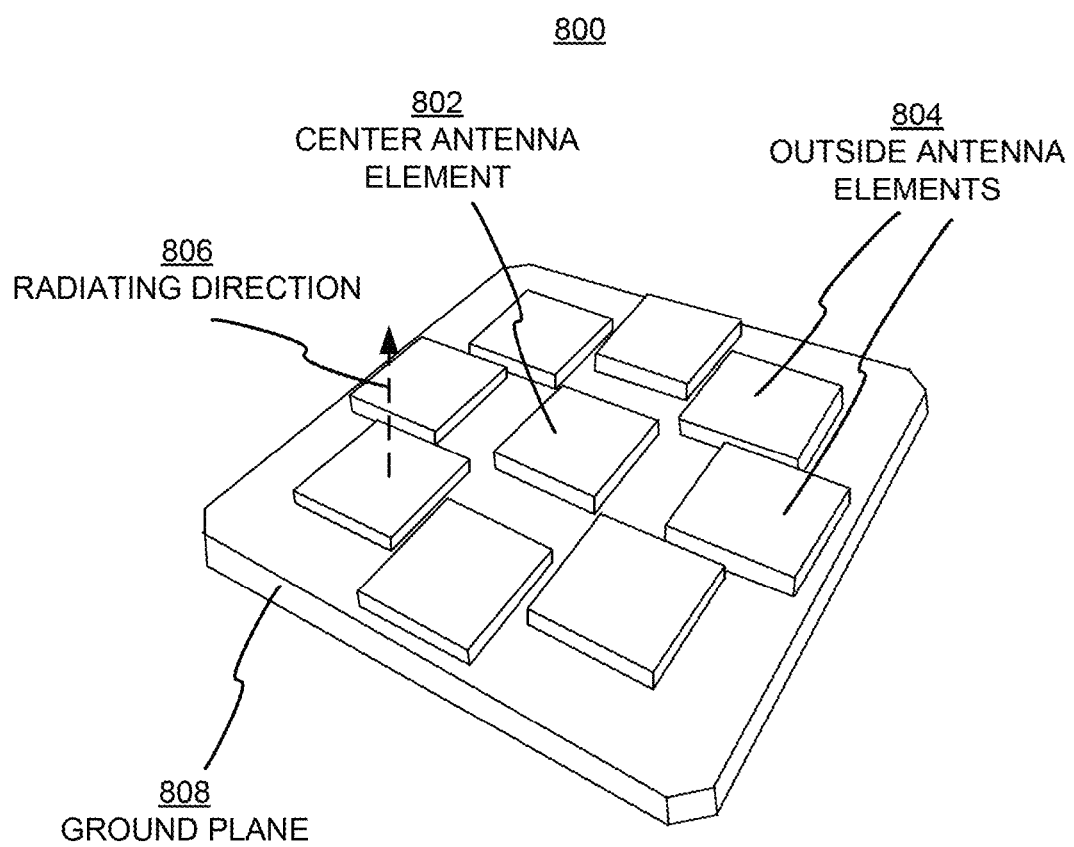
FIG. 8 depicts an antenna array according to embodiments.

In some embodiments, synthesized-beam RFID readers (SBRs) may be used for loss prevention. An SBR is capable of generating multiple radio frequency (RF) beams, and may be formed by coupling one or more RFID readers (or distributed portions of one or more readers) to an antenna array. FIG. 8 depicts a perspective view of an antenna array 800 with discrete radiating elements suitable for an SBR according to embodiments. Antenna array 800 includes an array of antenna elements 802 and 804, and a ground plane 808 behind elements 802 and 804. Each element has a radiating direction vector 806 (only shown for one element) that is typically, but not necessarily, perpendicular to the ground plane. An RF radiation pattern (or "beam") for receiving or transmitting an RF signal may be synthesized by adjusting the amplitude and/or phase of the signals coupled from/to each antenna element 802 and 804. The direction of the synthesized beam (typically represented by the direction of the beam's primary lobe—the lobe having the highest radiated power) is controlled by these various amplitude and/or phase adjustments. The adjustments may be analog, digital, or a mix of analog and digital. For example, during transmission, an SBR may generate the analog signal to be transmitted, split the signal, and then direct the split signals to elements 802 and 804 with different amplitudes and phases. Alternatively, the SBR may synthesize different signals for each antenna element digitally and then convert the digital signals to analog. In other embodiments the SBR may use a mix of these approaches. Similarly, during a receive operation the SBR may combine analog signals after appropriate phase shifting and amplitude adjustment of each, or it may digitize the signals from each element and combine them digitally, or a mix thereof.

The antenna elements of SBA 800 may be one or more of patch, slot, wire, horn, helical, distributed, or any other type as will be known to those skilled in the art. Whereas FIG. 8 only shows nine antenna elements, antenna arrays with any number of antenna elements may be used, including a single distributed element or an element made from metamaterials. In some embodiments ground plane 808 may be nonplanar (e.g., curved, concave, convex, etc.) and in other embodiments need not exist.

Figure 9A:
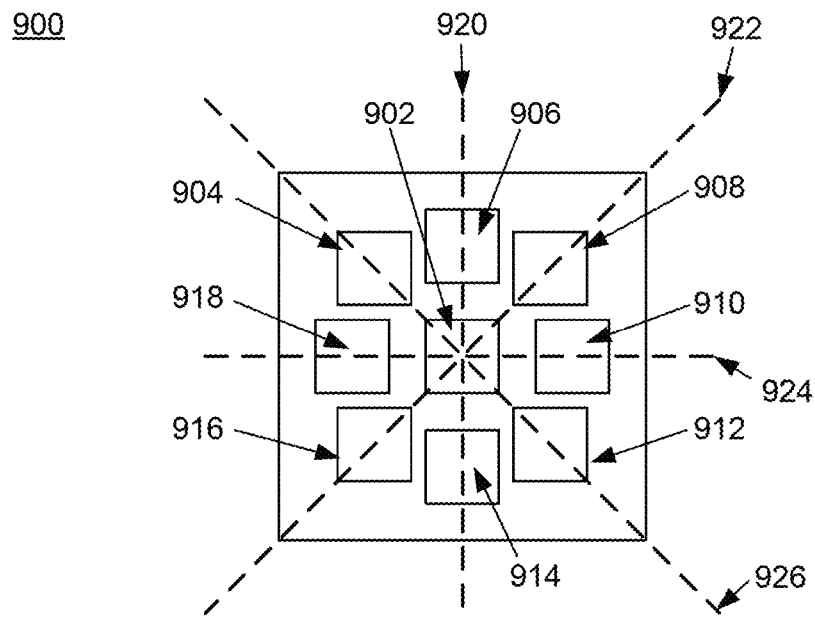
FIGS. 9A and 9B depict the antenna array of FIG. 8 synthesizing a beam in different physical directions, according to embodiments.
Figure 9B:
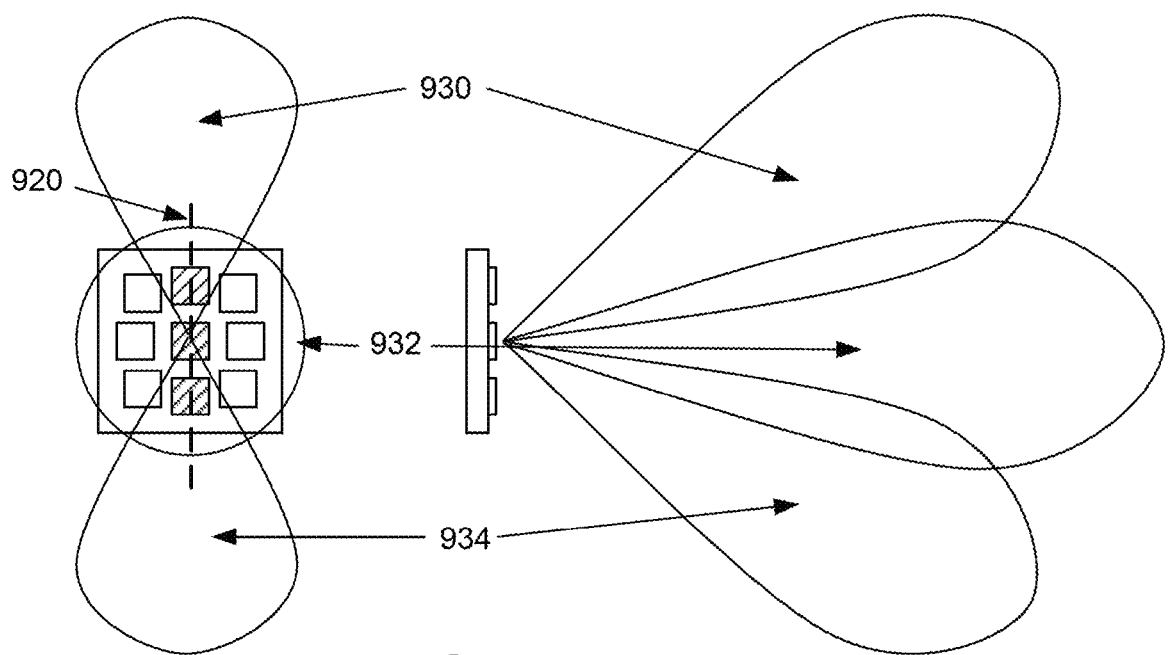

FIGS. 9A and 9B show the directions of some of the RF beams that SBA 900, similar to SBA 800 in FIG. 8, can generate. SBA 900 has nine antenna elements 902-918, with element 902 at the center and elements 904-918 around it. The shape and direction of the beam that SBA 900 generates depends on the signals to/from each element. Suppose that SBR 900 transmits using primarily elements 902, 906, and 914. Then, depending on the amplitude and phase of the signals applied to these elements, SBA 900 can steer a beam along the direction indicated by dashed line 920. In a similar fashion, suppose that SBR 900 transmits primarily using elements 902, 908, and 916. Then, depending on the amplitude and phase of the signals applied to these elements, SBA 900 can steer a beam along the direction indicated by dashed line 922. Of course, other steering arrangements are possible, including using all 9 elements to transmit and/or receive in arbitrary directions and to generate narrow beams.

FIG. 9B shows how RF beams with different directions can be synthesized using antenna elements located along line 920, with the diagram to the left depicting a head-on view similar to FIG. 9A and the diagram to the right depicting a side view. As described above, the beam direction can be controlled by varying the amplitude and phase of the signals to/from the antenna elements. For example, by applying a leading signal phase to element 906, an intermediate signal phase to element 902, and a trailing signal phase to element 914, the SBA will tend to steer its beam downward as in beam 934. Switching leading and lagging from elements 906/902 to elements 902/906 will tend to steer the beam upwards as in beam 930. Of course, the actual beam shape depends on both the magnitude of the phase shifting and the magnitude of the amplitude scaling (if any).

Figure 10:
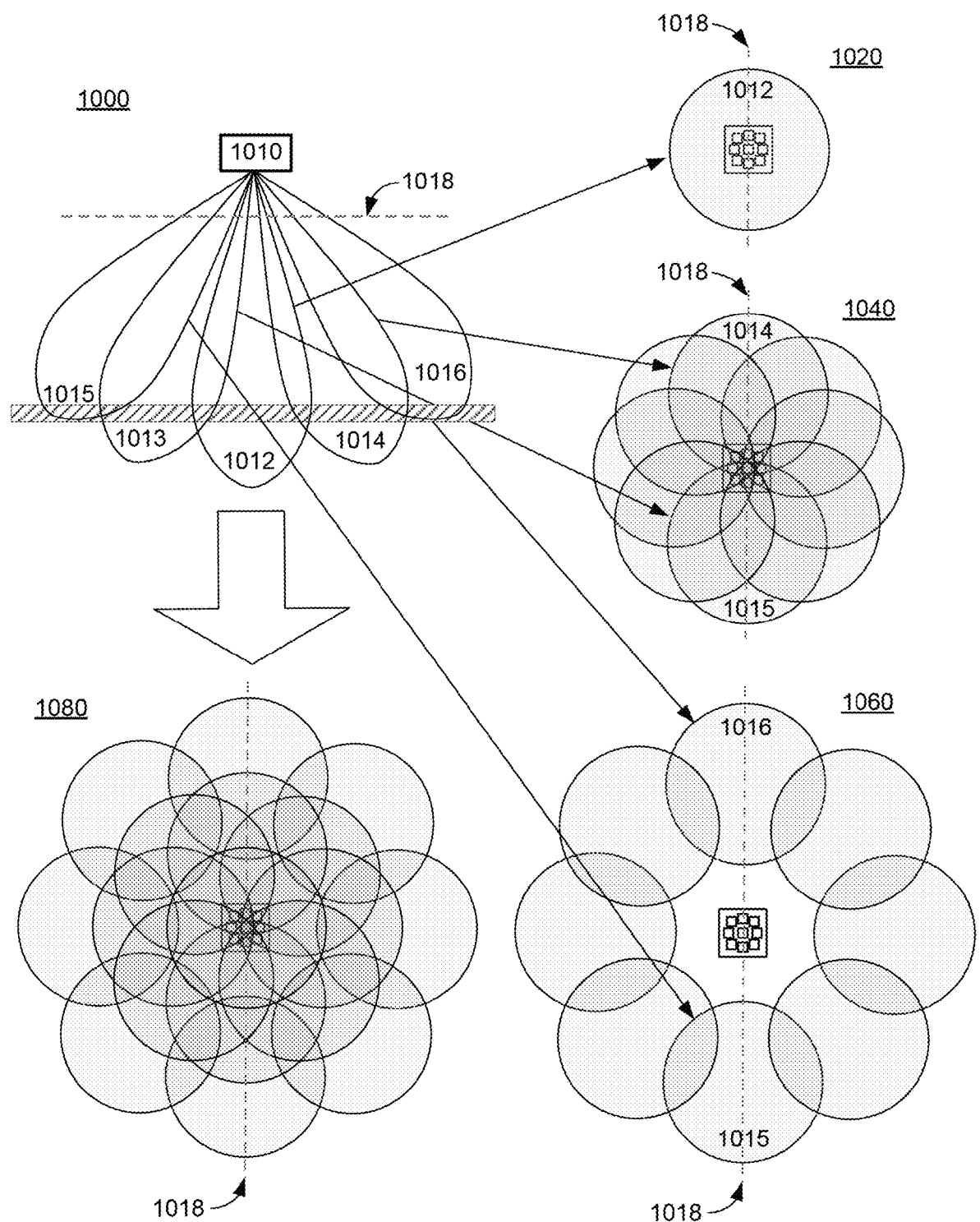
FIG. 10 depicts some of the potential beam locations that can be synthesized by the antenna array of FIG. 8, according to embodiments.

FIG. 10 depicts potential beams from an SBR according to embodiments. Diagram 1000 depicts a side perspective of SBR 1010, capable of synthesizing at least five different RF beams 1012, 1013, 1014, 1015, and 1016, arranged along line 1018 (similar to line 920 in FIG. 9A), with each RF beam pointed in a different direction.

Diagrams 1020, 1040, 1060, and 1080 depict coverage areas, shown as shaded circles, of the beam patterns generated by SBR 1010. A beam generated by an SBR has a coverage volume, also known as the beam's "field-of-view" (FoV) or "illumination", which is a volume in three-dimensional space where, during transmission, the transmitted energy density exceeds a threshold. A beam's coverage area is a projection of the beam's illumination on a surface. The illumination and coverage area may be different during transmit and receive, and may vary with reader or tag power, the thresholds, the distance between the SBR and the surface, and other parameters.

Diagram 1020 depicts the coverage area of central beam 1012. Diagram 1040 depicts the coverage areas of the inner beams such as 1014 and 1015. Diagram 1060 depicts the coverage areas of the outer beams such as 1015 and 1016. Finally, diagram 1080 depicts the total coverage area of all the beams formed by SBR 1010. As shown in diagrams 1020-1080, beam coverage areas may overlap. For example, inner beam 1014 may overlap with the central beam 1012, with one or more other inner beams, and with one or more other outer beams.

Whereas SBR 1010 is depicted as being able to generate and switch between five beams on an axis (e.g., axis 1018), in other embodiments an SBR may generate and switch between more or fewer beams on any given axis. Similarly, whereas SBR 1010 is depicted as being able to generate beams on four different axes (e.g., axes 920, 922, 924, and 926 in FIG. 9A), in other embodiments an SBR may be configured to generate beams on more or fewer axes. An individual beam's coverage area in FIG. 10 and subsequent figures is depicted as circular for simplicity, and in actuality may be of any suitable shape, and may vary based on interactions between the different elements that form the beam, as well as the orientation and topology of the surface on which the coverage area is projected. For example, a beam may have a non-circular coverage area. As another example, a circular beam that illuminates a surface with a non-perpendicular angle may project an elliptical coverage area on the surface.

When used to detect and inventory RFID tags, SBR 1010 may be configured to switch between different individual beams based on a desired beam scanning timing or pattern. For example, SBR 1010 may generate a first beam at a first time for a first time duration, then may switch to generating a second, different beam at a second time for a second time duration, and so on. The order, timing, and time durations with which SBR 1010 switches between generating different beams may be predefined or dynamic. In one embodiment, SBR 1010 may switch between different beams based on a predefined schedule and scan pattern. In another embodiment, SBR 1010 may dynamically determine the beams to generate, the times when they should be generated, and the time durations for which they should be generated based on environmental or other conditions (e.g., the actual or estimated number of tags present, actual or predicted tag movement patterns, RF interference, environmental noise, or any other suitable condition or parameter). In other embodiments, SBR 1010 may generate beams by dynamically adjusting a predefined schedule and scan pattern based on environmental conditions. SBR 1010 may be configured to switch beams to optimize the number of tags inventoried, optimize the ability to detect fast-moving tags, or be configured to provide any desired performance metric.

Figure 11:
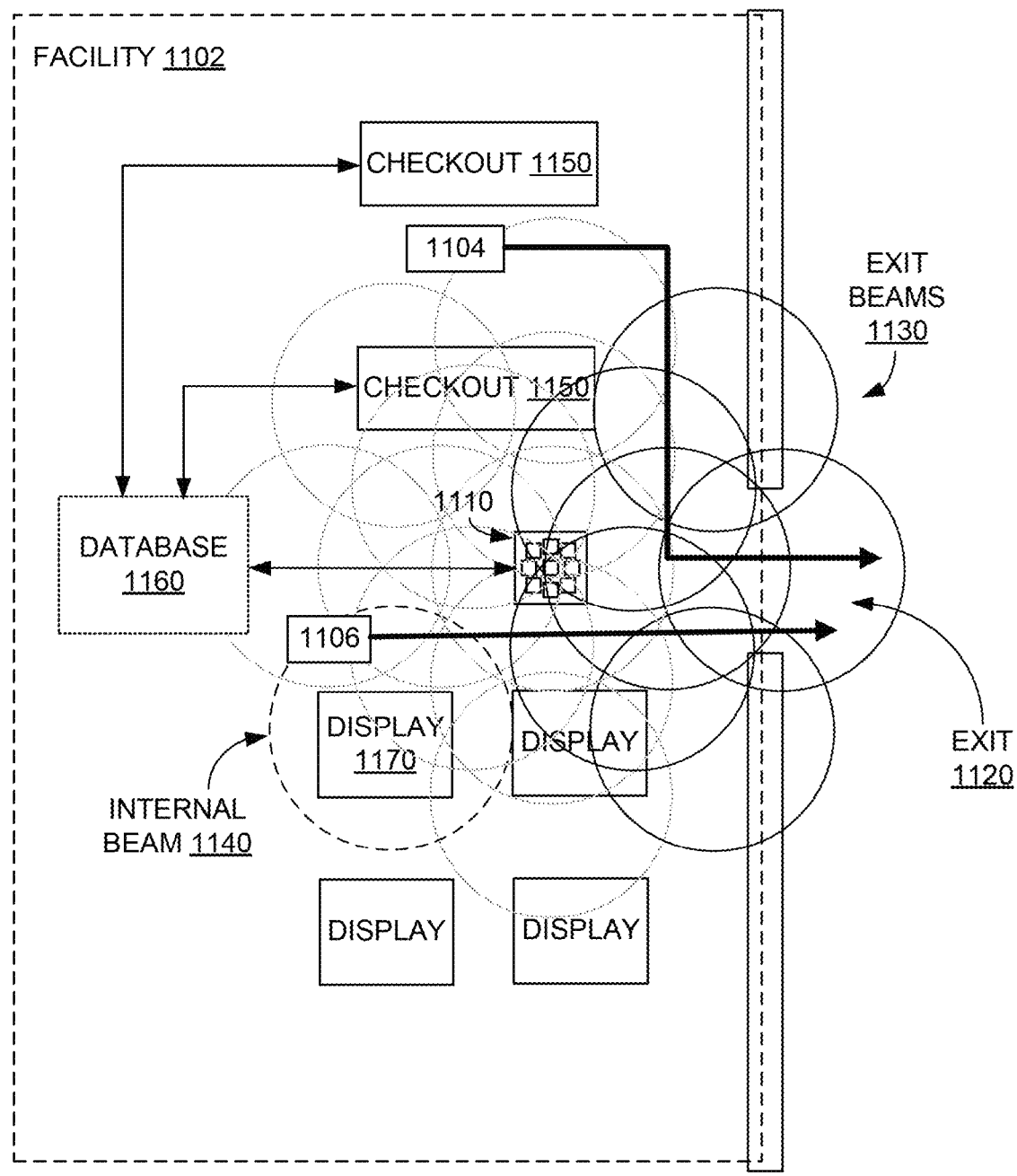
FIG. 11 is a diagram of a facility configured with a loss-prevention system (LPS).

As mentioned above, RFID technology may be employed in loss-prevention systems used to detect and prevent theft or unauthorized item movement. FIG. 11 is a diagram 1100 of a facility 1102 configured with a loss-prevention system (LPS). Facility 1102 has a perimeter or boundary delimited by a physical or virtual wall, border, fence, or similar. Physical boundaries include a physical wall, border, fence, or entrance/exit through any of the previous. Virtual boundaries may be determined with respect to a physical structure (e.g., a physical boundary such as a wall) or a location in physical space. For example, a virtual boundary may be defined as the perimeter or surface of an area or volume extending two meters outward from a wall, or may be defined as the perimeter/surface of an area/volume extending outward from a doorway in the wall. Facility 1102 is depicted in FIG. 11 as a retail or wholesale store, but in other embodiments may be a building, laboratory, yard, warehouse, distribution center, construction facility, plant, military installation, transit station (e.g., a train, bus, or subway station or an airport), ship, parking lot, shipping container, event grounds (such as a fairground), portion or section of the above, a location within or associated with one of the above, or similar.

Facility 1102 may include items tagged with RFID tags. A person, such as a customer, may remove an item having a tag 1104 from facility 1102 by first obtaining exit authorization from checkout station 1150, which includes an RFID reader. In one embodiment checkout station 1150 may be a point-of sale register or similar checkout terminal. In another embodiment checkout station 1150 may be a facility employee with a mobile checkout device such as a handheld reader, tablet, etc. In yet another embodiment checkout station 1150 may include or be a customer mobile device such as a smartphone that has an RFID reader. Many other types and embodiments of checkout terminals are possible. Regardless of the type, checkout station 1150 reads RFID tag 1104 and can authorize it and its associated item to leave facility 1102.

Before authorizing a tagged item to leave facility 1102, checkout station 1150 should obtain exit authorization, typically based on authorizing information provided by the person (e.g. customer) or an entity/proxy acting on behalf of the person. An example of the latter may be a facility employee, a legal authority such as a security person or the police, an autonomous entity such as a monitoring/security system, or any other proxy that can act on behalf of the person. The authorizing information may include customer identification or account information, payment, payment data (e.g., electronic currency or electronic gift card balance), payment authorization, credit-limit information, proof-of-payment, or other similar information. In some situations the authorizing information may also or instead include or be an employee number, item transportation information, a security code, a legal warrant, or other information suitable for a checkout station to determine whether tag 1104 and its associated item are authorized to leave facility 1102.

In some embodiments checkout station 1150 can self-verify the authorizing information and generate exit authorization. In other embodiments checkout station 1150 will engage with a linked entity to verify the authorizing information. Examples of a linked entity include a store network, store server, payment server, bank, credit-card company, legal entity such as government authority, or other networked entity. Upon verifying the authorizing information, checkout station 1150 authorizes tag 1104 and its associated item to leave facility 1102.

The facility 1102 further implements a loss-prevention system (LPS) configured to detect or prevent the departure of unauthorized tagged items from facility 1102. An LPS as described herein is configured to determine whether a tag exiting facility 1102 is facility-owned and, if so, whether the tag has exit authorization, for purposes of loss prevention. An LPS may include one or more tags (e.g., tag 1104), one or more readers configured to detect tags or tagged items exiting a facility, and/or some means to determine whether a detected tag or tagged item is authorized to exit the facility. An LPS may also include or implement security feature(s) configured to notify relevant personnel of unauthorized exits or to prevent unauthorized tags or tagged items from exiting the facility.

The LPS implemented at facility 1102 includes at least one reader 1110 positioned to detect tags transitioning through exit 1120 of facility 1102. Exit 1120 may include a door, doorway, gate, gateway, entryway, hallway, ramp, garage, elevator, escalator, stairway, stairwell, or any other suitable exit or entrance. In diagram 1100, reader 1110 is depicted as an SBR, although in some embodiments reader 1110 may include one or more non-SBR readers (i.e., readers not configured to generate synthesized beams) instead of or in addition to SBRs.

In diagram 1100, reader 1110 is positioned such that at least some of the beams it generates are directed toward or near exit 1120 of facility 1102. Reader 1110 can use these particular beams, labeled as exit beams 1130, to detect RFID tags (and their associated items) near, approaching, passing through, or having already passed through exit 1120. Exit beams 1130 may be directed substantially at exit 1120, substantially into facility 1102 but near exit 1120, and/or substantially outside or out of facility 1102 but near exit 1120. If reader 1110 includes one or more non-SBR readers, then the non-SBR readers may be positioned such that they generate exit beams 1130. For example, multiple readers may be positioned such that each reader generates at least one of the exit beams 1130, and multiple reader antennas, which may be coupled to one or more readers, may be positioned such that each antenna (in combination with a coupled reader) generates at least one of the exit beams 1130.

While reader 1110 is located within facility 1102 in FIG. 11, in other embodiments reader 1110 may be located at exit 1120 or external to facility 1102, as long as at least some of its beams are directed near or toward exit 1120, e.g. to form exit beams 1130. Reader 1110 may be mounted so as to point downward (e.g., on the ceiling of facility 1102 or in another elevated position), mounted so as to point horizontally (e.g., on a wall or other structure in facility 1102), mounted so as to point upward (e.g., on, at, or under a floor or structure in facility 1102), or some combination of the previous.

The LPS implemented at facility 1102 may also include database 1160. Database 1160 stores information about tagged items associated with facility 1102. This information may include tag identifiers; item identifiers; physical item information such as condition, status, or location; chain of custody; price; tracking information; manufacturer; or any other suitable tag or item information. Database 1160 may also store exit authorization for tags and/or tagged items. For example, when checkout station 1150 and/or a linked entity as described above determines that tag 1104 and its associated item have exit authorization, the checkout station 1150 and/or the linked entity may inform database 1160 accordingly. In some embodiments database 1160 may be prepopulated with item or tag identifiers, and exit authorization is added to the preexisting item record. In other embodiments database 1160 may not contain preexisting item or tag identifiers, in which case exit authorization for a tag or tagged item causes database 1160 to generate a new item record for the tag or tagged item.

Database 1160 may be accessible to checkout station 1150, the linked entity, and/or reader 1110 via a wired (e.g., Ethernet, parallel, serial, or other suitable wired protocol) or wireless (e.g., WiFi, cellular, Bluetooth, or other suitable wireless protocol) connection or network. In some embodiments, database 1160 is located at facility 1102, such as on a local computer, server, or RFID reader (including reader 1110 or checkout station 1150). In other embodiments database 1160 may be located remotely and accessible via a network connection. Database 1160 may reside on a single device (computer, server, or reader) or be distributed among multiple devices.

As an illustrative but non-limiting example, suppose that a customer purchases an item tagged with tag 1104, for example via interactions with checkout station 1150. Checkout station 1150, upon authorizing the purchase, may write data to tag 1104 indicating that the item associated with tag 1104 was properly purchased and therefore is authorized to leave facility 1102. For example, checkout station 1150 may write an electronic signature, a ticket, and/or an exit code or sold code to tag 1104 indicating that tag 1104 and its associated item are authorized to leave facility 1102. The customer then carries the tagged item through exit 1120. Reader 1110 will send commands to and receive replies from tag 1104 using exit beams 1130. The act of receiving replies from a tag may be known as "reading" the tag, and the replies themselves, which may refer either to data sent from the tag or the RF signals sent from the tag and encoding data, may be known as "reads" of the tag. Some reads of tag 1104 will include tag 1104's item and/or tag identifier. Upon receiving the identifier(s) the LPS may perform several actions. These actions may occur in series (i.e., one after the other), in parallel (i.e., two or more actions simultaneously or overlapping in time), or some combination of the two (i.e., some actions in series and some in parallel).

A first action that the LPS may perform is to determine whether tag 1104 is associated with facility 1102 (i.e., whether tag 1104 belongs to or is foreign to facility 1102). The LPS may determine the association by comparing the tag and/or item identifier to a list of items known to be associated with facility 1102. This item list is typically stored by database 1160, but in some instances may be stored elsewhere such as in a networked location, in reader 1110, or even in tag 1104. In some embodiments, each tag associated with facility 1102 may include in its memory an owner code indicating that it is associated with facility 1102 or an entity associated with facility 1102, and the LPS may read or retrieve the stored owner code from tags passing through exit beams 1130. The LPS also knows or is able to derive the owner code, and may read an owner code from tag 1104 and compare the read owner code with its known or derived owner code. If the two owner codes match, then the LPS may determine that tag 1104 and its associated item are associated with facility 1102. If the two owner codes do not match, then the LPS may determine that tag 1104 and its associated item are not associated with facility 1102. As another example, the LPS may be able to derive or retrieve identifiers for tags associated with facility 1102. Upon reading an identifier from tag 1104, the LPS may compare the read identifier to a derived/retrieved identifier to determine whether tag 1104 is associated with facility 1102, where a match between the two identifiers indicates that tag 1104 is associated with facility 1102 and a mismatch between the two identifiers indicates that tag 1104 is not associated with facility 1102.

A second action that the LPS may perform is to determine whether tag 1104 is stationary or passing through exit 1120. It may make this determination based on parameters of tag reads (e.g., RF signals sent from tags and encoding data) detected in exit beams 1130, such as signal phase, a received signal strength indication (RSSI), the sequence of exit beams in which tag 1104 is read, the identity or orientation of the exit beams in which tag 1104 is read, the time at which tag 1104 was read, and/or an angle-of-arrival of one or more RF signals received from tag 1104. It may also, or alternatively, use or provide information such as read count (for example, the number of reads of a tag over a particular time duration) or read rate (for example, the rate at which a tag is read as a function of time) per exit beam to determine whether tag 1104 is stationary or moving, and if the latter tag 1104's velocity and/or direction of travel. In some embodiments, tag 1104 itself may be configured to determine whether it is moving, and if so it may indicate its movement to the LPS, for example via a backscattered code. The LPS may use a location-determining algorithm, a direction-determining algorithm, a velocity-determining algorithm, or an algorithm combining location, direction, and/or velocity determination to determine whether tag 1104 is passing through exit 1120. In some embodiments, the LPS may use one or more of the techniques described in international application serial number PCT/US14/26319 filed on Mar. 13, 2014 and hereby incorporated by reference in its entirety. For example, the LPS may use two or more exit beams 1130 to track the movement (if any) of tag 1104 based on a multi-session, non-acknowledging inventorying procedure as described in the above-referenced international application.

The LPS may also (or instead) determine the location of tag 1104 to confirm whether tag 1104 is inside or outside facility 1102, for example using one or more techniques described above or in international application serial number PCT/US14/26319 as referenced previously. In one example, the LPS may determine the location of tag 1104 based on where an RF signal from tag 1104 emanates from or originates. If the LPS determines that an RF signal from tag 1104 emanates from within facility 1102, the LPS may determine that tag 1104 is within facility 1102. If the LPS determines that an RF signal from tag 1104 emanates from outside facility 1102, the LPS may determine that tag 1104 is outside facility 1102. The LPS may determine the location from which an RF signal emanates using angle-of-arrival (described below), the identity or orientation of beams in which the RF signal was received, and/or any other suitable parameter indicative of RF signal emanation location. The LPS may determine that tag 1104 and its associated item are exiting facility 1102 if it determines that tag 1104 is inside facility 1102 but moving towards exit 1120 or if tag 1104 is near or passing through exit 1120. In some embodiments, if the LPS determines that tag 1104 is outside facility 1102, the LPS may determine that tag 1104 and its associated item has exited facility 1102 even if the LPS did not detect tag 1104 passing through an entrance or exit of facility 1102.

After determining tag read parameters as described above, the LPS may store the tag read parameter(s) in a database (e.g., database 1160) for future reference. For example, upon determining a tag read parameter associated with tag 1104, the LPS may associate the tag read parameter with an identifier of tag 1104 in database 1160. Subsequently, upon detecting a tag reply, the LPS may use the stored tag read parameters to assist in identifying the replying tag and/or determining some characteristic of the replying tag (e.g., whether the replying tag has moved, whether the tag is in an appropriate location, whether the tag has been authorized to exit facility 1102, or any other suitable characteristic).

A third action that the LPS may perform is determining whether tag 1104 and its associated item are authorized to exit facility 1102. In some embodiments the LPS may determine whether a tag is authorized to exit facility 1102 based on one or more of the techniques described in U.S. Pat. Nos. 8,593,257, 8,866,595, 8,872,636, 8,866,596, and 9,189,904, all of which are hereby incorporated by reference in their entireties. For example, the LPS may read (via reader 1110 or another reader) data such as an electronic signature, a ticket, and/or an exit code or sold code from tag 1104, and may use the data to determine whether tag 1104 and its associated item are authorized to leave facility 1102, in conjunction with database 1160 which may contain information about whether tags are authorized to exit facility 1102) or independently. In some embodiments, the LPS may determine whether tag 1104 is authorized to leave facility

1102 by determining whether tag 1104 is on a list of tags and associated items authorized to leave facility 1102.

As a result of the various actions described above, the LPS can determine whether tag 1104 and its associated item belong to facility 1102, are exiting facility 1102, and are authorized to do so. If so authorized then the LPS permits tag 1104 and its associated item to exit facility 1102 (in other words, allows tag 1104 and its associated item to exit without taking security actions as described below), and may record information about the exit (e.g., time of exit, location of exit, tag and item exiting, other tags or items exiting at the same time, etc.) in the memory of reader 1110 or other readers, in database 1160, or in any other suitable local or remote memory.

On the other hand, if the LPS determines that tag 1104 is not authorized to exit facility 1102 then it may take one or more security actions using implemented security features. For example, security actions may include issuing alerts, monitoring the unauthorized exit, attempting to prevent the unauthorized exit, and/or any other suitable action for preventing or hindering the exit of tag 1104 through exit 1120. In some embodiments, the LPS may issue alerts by activating an audible, silent, or visual alarm, activating a security system, activating a security procedure, alerting an entity associated with facility 1102 (e.g., an employee or manager), notifying an authority (e.g., security personnel, police personnel, military personnel, a facility supervisor, or any other authorized person), writing an alert code to the tag 1104 (e.g., a code that notifies a reader reading tag 1104 that tag 1104 or its associated item has been stolen), refraining from writing a code to tag 1104 (e.g., refraining from writing a code indicating that tag 1104 is authorized to exit), adjusting a record associated with the tag 1104 and/or its associated item (for example, in the memory of reader 1110 or other readers, in database 1160, or in some other memory) to indicate the unauthorized exit, and/or sending a message regarding the unauthorized exit to an entity or authority associated with facility 1102 or to some external entity or authority (e.g., a local police department). The LPS may monitor the unauthorized exit by directing a camera toward exit 1120 and/or taking a picture or a video from a camera directed toward exit 1120. The LPS may attempt to prevent the unauthorized exit by securing a physical barrier such as by locking a door or gate or activating an obstruction (e.g., a barrier) associated with exit 1120.

In some embodiments reader 1110 may be used both for loss-prevention and for inventorying tags or items in facility 1102, for example for stock-keeping purposes. For example, reader 1110 may be positioned to generate exit beams 1130 and at least one internal beam 1140 directed within facility 1102. As shown in FIG. 11, internal beam 1140 may be directed to a display 1170 holding items with tagged merchandise. In other embodiments, internal beams may be directed to shelves, containers, pallets, racks, counters, cases, boxes, portions of the above, or any other suitable tag or item organization means. Reader 1110 may use internal beam 1140 to identify, locate, track, and/or authenticate tagged items within facility 1102. Upon reading a tagged item associated with facility 1102, reader 1110 may update a server or database (e.g., database 1160) with information about the tagged item, such as its location and/or movement.

As described above, the LPS may be configured to determine whether a tag is stationary or moving. In some embodiments, the LPS may be configured to respond differently based on whether a tag is stationary or in motion. For example, in situations where facility 1102 contains a large number of tagged items, the LPS may be configured to suppress reads of stationary tags, thereby allowing it to devote more time to reading moving tags or other tags of interest. In some embodiments, the LPS may cause a stationary tag not to participate in one or more subsequent inventory rounds using the refresh or multi-session non-acknowledging functionalities described in international application serial number PCT/US14/26319 referenced above.

In some embodiments, the LPS may be configured to increase the rate at which moving tags are inventoried, and may be configured to maintain or reduce the rate at which stationary tags are inventoried. For example, the LPS may determine whether a tag is in motion based on beam read counts, angle-of-arrival measurements, or any other suitable method. In some embodiments, a tag in motion may notify the LPS of its movement, for example via a tag reply or by asserting a stored flag. If the LPS determines that an inventoried tag is in motion, it may increase the rate at which the tag is inventoried or participates in inventory rounds, for example by transmitting inventory commands specifically targeting the tag, successively inventorying the tag without inventorying other tags, increasing the tag inventorying rates of the beams at or near the tag's location, using a non-acknowledging functionality as described herein, or using any other suitable techniques. If the LPS instead determines that an inventoried tag is stationary, it may either maintain or reduce the rate at which the tag is inventoried, for example by suppressing tag reads using the refresh functionality described above.

Figure 12:
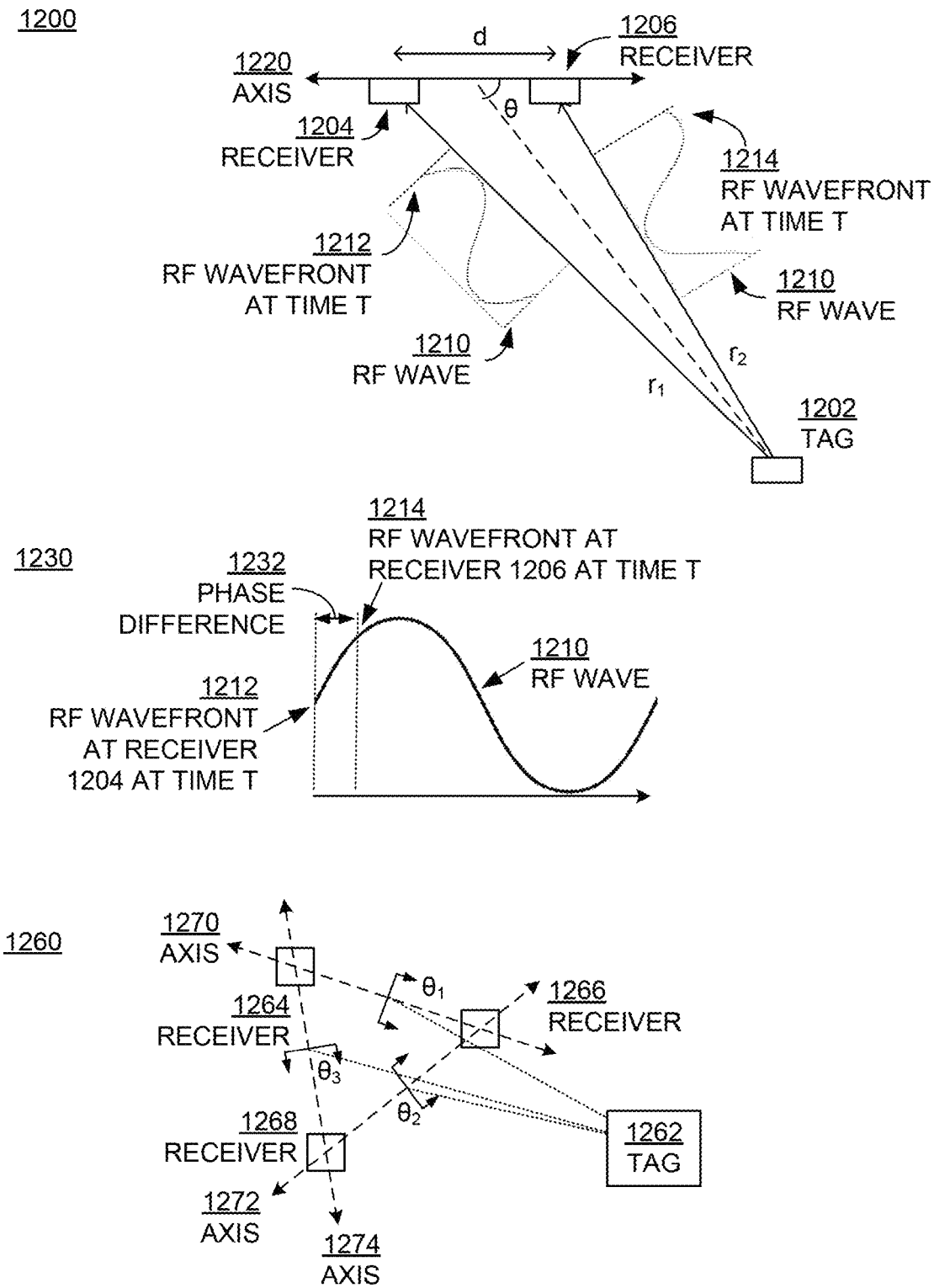
FIG. 12 depicts how the angle-of-arrival of an RF wave can be determined.

In some embodiments, an LPS may determine where a tag is located and/or whether the tag is moving based on angle-of-arrival information associated with RF waves or signals from the tag. FIG. 12 depicts how the angle-of-arrival of an RF wave can be determined. Diagram 1200 depicts a situation in which two receivers 1204 and 1206 detect an RF wave from an RFID tag 1202. Receivers 1204 and 1206 may be separate readers, or separate antennas or antenna elements coupled to a single reader or to multiple readers, and may be configured to each transmit different beams or together synthesize a single beam oriented in a particular direction, as described above. Receivers 1204 and 1206 and tag 1202 may be disposed such that distance $r_1$ between tag 1202 and receiver 1204 is greater than distance $r_2$ between tag 1202 and receiver 1206. Accordingly, an RF wave or signal originating from tag 1202 will first arrive at receiver 1206 and then arrive at receiver 1204, assuming that the propagation paths between tag 1202 and the receivers 1204 and 1206 are relatively equivalent except for distance.

The difference between the RF wave as seen at receiver 1204 and the RF wave as seen at receiver 1206 may be characterized as a time difference or a phase difference. The former may be determined by comparing the time at which a particular wavefront of the RF wave arrives at receiver 1204 to the time at which the same wavefront arrives at receiver 1206. The latter may be determined by comparing the phases of the RF waves observed at receiver 1204 and receiver 1206 at a particular time.

For example, consider RF wave 1210. At some initial time, tag 1202 begins to transmit or backscatter RF wave 1210. Receiver 1206 observes the beginning of RF wave 1210 before receiver 1204, because receiver 1206 is closer to tag 1202 than receiver 1204. At some later time T, receiver 1204 then observes the beginning of RF wave 1210 as wavefront 1212. At the same time T, receiver 1206 observes wavefront 1214, which is a portion of RF wave 1210 subsequent to the wavefront 1212. The difference between wavefront 1212 and wavefront 1214 may be represented as a phase difference 1232, as depicted in diagram 1230. Phase difference 1232, when combined with the (known) distance d between receiver 1204 and receiver 1206, may be used to determine the angle θ between axis 1220 on which receivers 1204 and 1206 lie and a line that intersects both tag 1202 and the point on axis 1220 midway between receivers 1204 and 1206. This angle θ may be referred to as the "angle-of-arrival" (or AoA) of RF wave 1210 with respect to the receivers 1204 and 1206, and represents the angle from which RF wave 1210 arrived, and therefore may represent the angle at which tag 1202 is located with respect to the receivers 1204 and 1206.

Instead of or in addition to using RF wave phase offsets, in some embodiments edge offsets in an RF signal or symbol offsets in a tag reply may be used to determine AoA. In some embodiments, a reply sent by tag 1202 may encode a particular symbol sequence at a particular tag symbol rate, for example as described in the Gen2 Specification. The propagation distance difference between tag 1202 and receivers 1204 and 1206 may cause receiver 1204 to receive particular symbol(s) slightly after receiver 1206 receives the same symbol(s). The timing difference in the reception of the symbol(s) may then be used to determine the AoA of the tag reply and tag 1202.

Before determining the AoA of a received tag reply, the controller coupled to receivers 1204 and 1206 may first determine whether the tag replies or RF waves received at receivers 1204 and 1206 are in fact versions of the same signal that are phase-shifted with respect to each other. For example, a controller may determine whether the signals received at receivers 1204 and 1206 are modulated in the same way, encode the same symbols at the same tag symbol rate, or otherwise originate from the same source. The controller may also determine whether the signals received at receivers 1204 and 1206 are offset or phase-shifted with respect to each other. For example, the controller may determine whether the two signals have a phase offset. In some embodiments, the controller may buffer at least a portion of an initially-received tag signal and compare the buffered portion to a portion of a subsequently-received tag signal, using an appropriate phase or symbol offset if necessary. If the two portions substantially match, then the controller may conclude that the initially-received and subsequently-received tag signals correspond to the same tag signal. If the controller also determines that the two signals have a phase offset, then the controller may conclude that the two signals are phase-shifted with respect to each other.

Using a tag signal's AoA measured with respect to a single axis (e.g., axis 1220) localizes the tag's location to a conical surface (or a circular area if the angle-of-arrival is 90°) defined by the AoA and the axis. Further physical constraints may further localize the tag location. For example, receivers 1204 and 1206 may be mounted on a ceiling or wall and configured to look downward or outward, which may localize the tag location to at most half of the conical surface defined by the AoA. Furthermore, if receivers 1204 and 1206 are mounted on a ceiling and facing a floor, then the tag location may be further localized to be within some distance of the floor (or equivalently at least some distance away from the ceiling).

In some embodiments, additional AoA measurements made using other receivers may also be used to localize a tag. Diagram 1260 depicts three non-collinear receivers 1264, 1266, and 1268. The receivers are disposed such that receivers 1264 and 1266 lie on axis 1270, receivers 1266 and 1268 lie on axis 1272, and receivers 1264 and 1268 lie on axis 1274, but receivers 1264, 1266, and 1268 do not share a single axis. When a reply from tag 1262 is received, receivers 1264 and 1266 may be used to determine a first AoA $θ_1$ of the reply with respect to axis 1270, receivers 1266 and 1268 may be used to determine a second AoA $θ_2$ of the reply with respect to axis 1272, and receivers 1264 and 1268 may be used to determine a third AoA $θ_3$ of the reply with respect to axis 1274. Once two or more reply AoAs measured with respect to different axes are known, triangulation may be used to further localize the location of tag 1262. Using AoA measurements from three or more receivers, in addition to providing two-dimensional location capability as described above, may allow tag location to be further refined. For example, AoA measurements of a tag taken from three or more receivers that are not necessarily collinear may allow the direction and/or the distance of the tag with respect to the receivers to be determined with more accuracy, for example by using a linear fit or some other fitting algorithm.

FIG. 13 depicts several examples of how angle-of-arrival may be used to determine the location, direction, and/or velocity of a moving tag. Diagram 1300 depicts a facility 1302, similar to facility 1102, with an SBR 1312 positioned to monitor facility exit 1304. SBR 1312 has multiple antenna elements, and may be configured to perform AoA measurements with its antenna elements as described in FIG. 12 to determine tag location. Initially, SBR 1312 may detect a reply from tag 1306 within facility 1302 with an AoA 1322. Subsequently, SBR 1312 may detect another reply from tag 1306 with a different AoA 1324. SBR 1312 (or an LPS coupled to SBR 1312) may be able to use the AoAs 1322 and 1324 to determine a travel parameter associated with tag 1306. For example, as described above SBR 1312 may be able to determine the location of tag 1306 at a particular time based on the measured AoAs 1322 and 1324. SBR 1312 may also be able to determine whether tag 1306 is stationary or moving. If AoAs 1322 and 1324 had been substantially similar, SBR 1312 may conclude that tag 1306 is substantially stationary. On the other hand, if AoAs 1322 and 1324 are substantially different, as depicted in diagram 1300, SBR 1312 may conclude that tag 1306 is moving. SBR 1312 may further be able to conclude based from the AoAs 1322 and 1324 that tag 1306 has a travel direction toward exit 1304. If timestamps associated with AoAs 1322 and 1324 are available, SBR 1312 may also be able to determine an average travel velocity of tag 1306 in the time duration between the measurements of AoAs 1322 and 1324.

Diagram 1330 depicts facility 1332, similar to facility 1302, with a reader 1342 positioned to monitor facility exit 1334. Reader 1342 may not be an SBR, but is configured with multiple antenna elements for AoA determination. Similar to the situation described in diagram 1300, reader 1332 may initially detect a reply from tag 1336 with an AoA 1352, and may subsequently detect another reply from tag 1336 with a different AoA 1354. Reader 1332 (or an LPS or controller coupled to reader 1332) may then use the AoAs 1352 and 1354, as well as associated timestamps, to determine one or more travel parameters associated with tag 1336, such as its location, whether it is stationary or traveling, and if the latter its direction of travel and/or velocity of travel.

Diagram 1362 depicts facility 1362, similar to facilities 1332 and 1302, with two readers 1372 and 1374 positioned to monitor facility exit 1364. Readers 1372 and 1374 are configured with multiple antenna elements for AoA determination and are depicted as similar to reader 1342, but in other embodiments, one or both of readers 1372/1374 may be SBRs similar to SBR 1312. Readers 1372 and 1374 may initially detect a reply from tag 1366, with reader 1372 measuring AoA 1382 and reader 1374 measuring AoA 1386. Subsequently, readers 1372 and 1374 may detect another reply from tag 1366, with reader 1372 measuring AoA 1384 and reader 1374 measuring AoA 1388. Readers 1372 and 1374 (or an LPS/controller coupled to both readers) may then use the AoAs 1382-1388, as well as associated timestamps, to determine one or more travel parameter(s) associated with tag 1366, as described above. In some embodiments, the additional AoA measurements from the additional reader may be used to further refine the travel parameter determination process.

In some embodiments, read zones may be used for tag inventorying or tracking purposes. A read zone may be based on the field-of-view or coverage volume of one or more readers or antennas, and may correspond exactly to a reader/antenna coverage volume, may include portions of multiple coverage volumes, or may correspond to part of a coverage volume. In some embodiments, read zones may correspond to particular regions in a facility. For example, different rooms, corridors, entrances, and exits in a building may be different read zones. As another example, individual fixtures, such as shelving units, individual shelves, cabinets, or tables may be different read zones. In some embodiments, different parts of an individual fixture (e.g., different sections of a shelf) may be different read zones. Different read zones may at least partially intersect, or may be entirely disjoint. In some embodiments, a read zone may entirely contain one or more other read zones.

Figure 14:
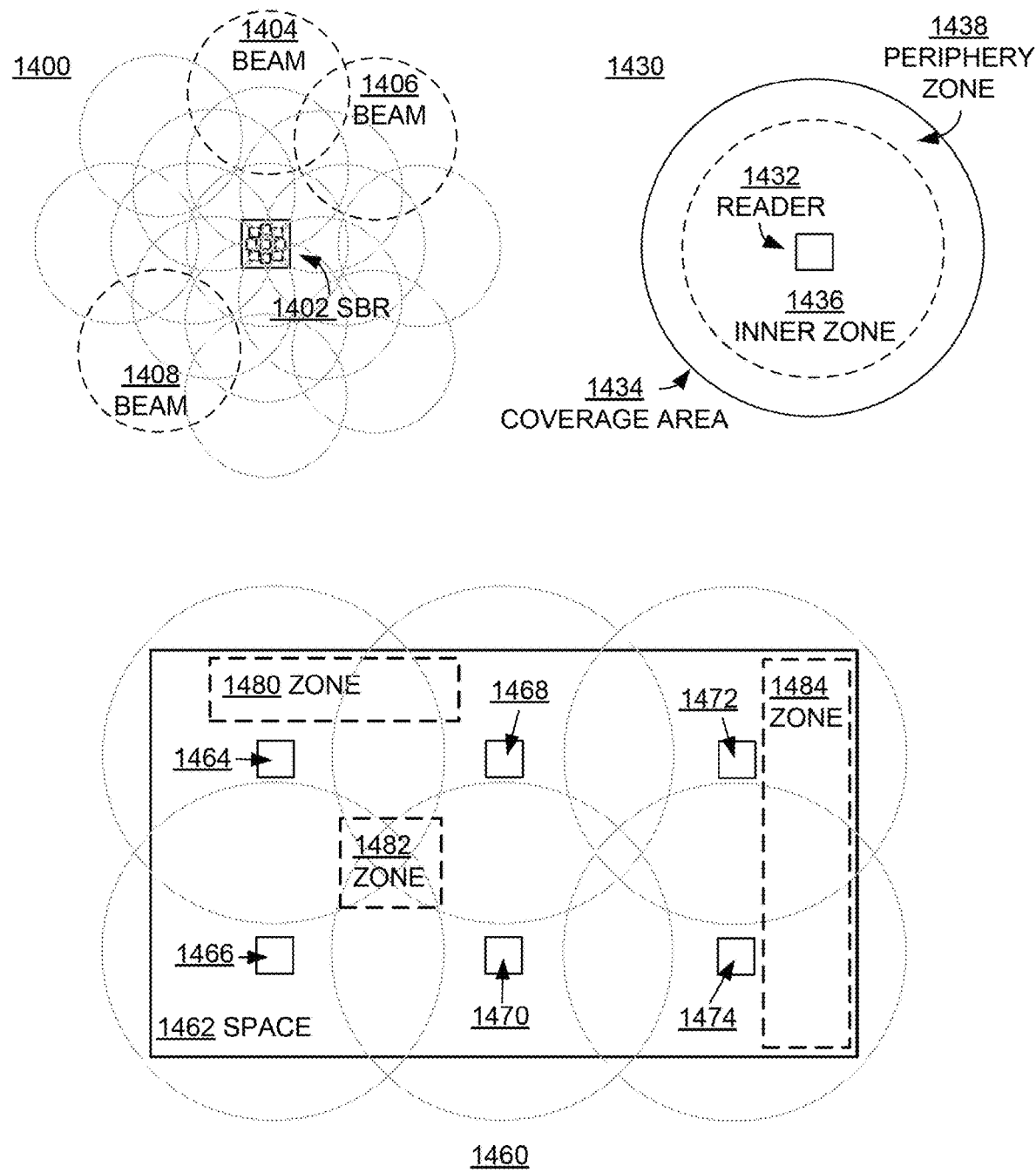
FIG. 14 depicts how RFID readers may be configured to provide read zones in an environment, according to embodiments.

FIG. 14 depicts how RFID readers may be configured to provide read zones in an environment, according to embodiments. Diagram 1400 depicts the coverage area of SBR 1402, similar to coverage area 1080 of SBR 1010. In some embodiments, SBR 1402 may be configured to provide a number of read zones, each corresponding to an individual SBR beam or combination of SBR beams. For example, beam 1408 of SBR 1402 may correspond to a first read zone, and beams 1404 and 1406 may together correspond to a second read zone. If SBR 1402 reads a tag using beam 1408, it may conclude that the tag resides in the first read zone. If instead SBR 1402 reads a tag using beam 1404 or beam 1406, it may conclude that the tag resides in the second read zone.

Diagram 1430 depicts coverage area 1434 of flood reader 1432. A flood reader, unlike an SBR, may be configured to generate a single, relatively static beam. In some embodiments, coverage area 1434 may be divided into multiple read zones. For example, coverage area 1434 may be divided into at least an inner zone 1436 and a periphery zone 1438. In some embodiments, flood reader 1432 may be configured to determine whether a detected tag is in inner zone 1436 or periphery zone 1438 by determining the AoA (described above) associated with a response from the tag. Accordingly, flood reader 1432 may be configured with two or more antenna elements. The antenna elements may be arranged such that flood reader 1432 can determine the AoA of a received tag response and thereby determine whether the responding tag resides in inner zone 1436 or periphery zone 1438. Of course, in other embodiments other techniques may be used to determine whether a detected tag is in inner zone 1436 or periphery zone 1438. For example, the flood reader 1432 may use a received signal strength indicator (RSSI) to determine where a detected tag resides, or may use one or more of the location-determining techniques described above.

Diagram 1460 depicts how individual read zones may be provided by multiple read points. Diagram 1460 depicts space 1462, which may be part or all of a facility such as facility 1102, described above. A number of RFID read points (which may include readers and/or reader antennas) 1464-1474 may be deployed to provide coverage of at least a portion of space 1462, if not substantially the entire space 1462. Read points 1464-1474 may be part of an LPS as described above, in which read points 1464-1474 cooperate with each other and/or are coordinated by a central controller, or may be configured to operate independently. In some embodiments, the operation mode of each read point may be dynamic. For example, a particular read point may switch between independent operation, cooperating operation, and central-controller-driven operation based on time, environmental conditions, or any other suitable parameter.

Space 1462 may include one or more read zones, as described above. For example, space 1462 may include read zone 1480, read zone 1482, and read zone 1484. Read zones 1480-1484 may correspond to particular regions of space 1462, specific fixtures within space 1462, and/or different portions of fixtures within space 1462, and may not exactly coincide with read point coverage volumes. For example, read zone 1480 includes portions (but not all of) of the coverage volumes of read points 1464 and 1468, read zone 1484 includes portions of the coverage volumes of read points 1472 and 1474, and read zone 1482 includes portions of the coverage volumes of read points 1464-1470. In such situations, the LPS may determine whether an inventoried tag is within a read zone by first determining the location of an inventoried tag (e.g., via AoA and/or other techniques described herein) and then determining whether the tag location is within any read zones. In some embodiments, the LPS may store or have access to information about the size, location, and/or boundaries of read zones 1480-1484, for example in the form of physical coordinates with respect to one or more fixed reference points or the identity of marker or infrastructure tags associated with specific read zones and read zone boundaries. Upon detecting a tag, the LPS may determine one or more location parameters associated with the tag, such as AoA parameters, distance parameters, physical coordinates, and the like. The LPS may then compare the determined location parameters to read zone information to determine whether the detected tag is within one or more read zones.

In some embodiments, the LPS may be configured to adjust inventorying parameters based on whether a detected tag is located in a particular read zone or not. For example, the LPS may be configured to inventory a tag at a higher rate if the LPS determines that the tag is located in a read zone associated with relatively high tag or item movement. Conversely, the LPS may be configured to inventory a tag at a lower rate if the tag is located in a read zone associated with relatively low tag or item movement. In some embodiments, such inventorying parameter adjustment may be used for loss-prevention purposes, as described below.

FIG. 15 depicts how RFID readers may be used to monitor tagged items at particular risk of theft, according to embodiments. Diagram 1500 depicts a space 1502 with RFID tags 1510 and 1512. Space 1502 may be a facility that stores RFID-tagged items, such as a warehouse or a retail establishment. Space 1502 further includes read point 1522, positioned to monitor and inventory tags and tagged items within space 1502. Read point 1522 may be a reader such as a flood reader or an SBR, or an antenna coupled to a reader, and may be part of a larger LPS or may operate independently. Read point 1522 may be configured to communicate with database 1520, which may store information about tags, items, and/or read zones within space 1502, similar to database 1160 described above.

Space 1502 further includes an entrance or exit 1504, through which customers and/or employees may enter or exit space 1502, near or at a boundary of space 1502. A read zone 1506 may be defined near exit 1504 for loss-prevention purposes. For example, tagged items within read zone 1506 and therefore relatively close to the exit 1504 and the associated boundary of space 1502 may have a higher probability or risk of inappropriately leaving (for example, as a result of being stolen) space 1502 than tagged items within space 1502 but not within read zone 1506, due to item proximity to the exit 1504. The probability or risk that a tagged item inappropriately leaves, exits, or transitions from space 1502 is referred to as the tagged item's "transition risk", and may be correlated to the probability of theft of the tagged item. Read point 1522 may be configured to have read zone 1506 within its coverage volume. For example, read point 1522 may be configured to associate certain locations, AoA ranges, and RF beams (if an SBR or otherwise configured to generate and/or manage multiple RF beams) with read zone 1506. Read point 1522 may be further configured to determine whether a detected tag is located within read zone 1506 and is associated with an item that has a relatively high transition risk. In response to determining that a particular tag is associated with an item having a relatively high transition risk, read point 1522 may adjust one or more inventorying parameters to increase the probability or likelihood that an inappropriate (e.g., unauthorized) transition of the tag from space 1502 is detected.

For example, tags 1510 and 1512, each associated with a respective tagged item, are present in space 1502. Tag 1510 is positioned relatively near exit 1504 and within read zone 1506, whereas tag 1512 is positioned relatively far from exit 1504, outside of read zone 1506 and potentially in one or more other read zones (not depicted). During tag inventorying, read point 1522 may detect and locate tags 1510 and 1512. Read point 1522 may further determine that tag 1510 is located within read zone 1506 (for example, because a reply from tag 1510 is received on a beam oriented at read zone 1506) and therefore its associated item may have a relatively high transition risk, while tag 1512 is not located within read zone 1506 (for example, because replies from tag 1512 were not received on a beam oriented at read zone 1506) and therefore its associated item may have a relatively low transition risk. In response, read point 1522 may adjust one or more inventorying parameters associated with tag 1510 and/or read zone 1506 to increase the probability that an inappropriate transition of items associated with tag 1510 and/or other tags within read zone 1506 is detected. For example, read point 1522 may cause tag 1510 to respond more frequently to inventory commands, as described below. As another example, if read point 1522 is an SBR, it may increase the rate at which it switches to the beams oriented toward read zone 1506 with respect to beams oriented elsewhere, or it may increase the duration of beams oriented toward read zone 1506 with respect to beams oriented elsewhere. The increased rate or duration of beams oriented toward read zone 1506 with respect to beams oriented elsewhere may allow tags within zone 1506 to be detected and inventoried more frequently than tags located elsewhere, thereby increasing the probability that an inappropriate transition of a tagged item within zone 1506 is detected. In some embodiments, read point 1522 may also have the option of adjusting inventorying parameter(s) associated with tag 1512 upon determining that tag 1512 is associated with an item having a relatively low transition risk. For example, read point 1522 may not adjust any inventorying parameters associated with tag 1512. As another example, read point 1522, if an SBR, may reduce the rate at which it switches to the beam(s) oriented toward tag 1512 and/or may reduce the duration of beams oriented toward tag 1512.

In some embodiments, read point 1522 may use a nonacknowledgement process, as described in international application serial number PCT/US14/26319 referenced above, to inventory tag 1510 or other tags associated with items having relatively high transition risk. A tag inventorying process (for example, as described in the Gen2 Specification) involves a series of inventory rounds, where each inventory round includes a number of steps in which information is exchanged between a reader and one or more tags. Reader-tag exchanges in individual inventory rounds may cause state changes in the participating reader and/or tags—for example, the reader may request an identifier from a tag, the tag may reply with its identifier, the reader may acknowledge receipt of the identifier, and the tag may then assert a session flag associated with a specific session (e.g., S0, S1, S2, or S3 according to the Gen2 Specification) in response to the acknowledgement, thereby switching from a first state (in which a particular session flag is unasserted) to a second state (in which the particular session flag is asserted). The tag in the second state may not participate in at least one subsequent inventory round for the specific session by refraining from responding to reader inventory commands targeting tags with unasserted session flags for the specific session (i.e., tags in the first state). This increases the probability that other, uninventoried tags are inventoried by the reader, but also in effect reduces the rate at which the tag is read by the reader. If an item associated with the tag has a relatively high transition risk (e.g., as a result of being positioned near an exit or being of relatively high value), then there may be a corresponding increase in the probability that an inappropriate transition of the tagged item will go undetected.

In some embodiments, a reader may perform a nonacknowledgement process to prevent the tag from asserting its session flag for a particular session, thereby preventing the tag from switching to the second state. The reader may perform the nonacknowledgement process by beginning an inventory round as described above, but either (a) not acknowledge receipt of the tag-provided identifier or (b) transmit a nonacknowledgement command to the tag. The NAK command in the Gen2 Specification is one such nonacknowledgement command, although other commands in the Gen2 Specification may have the effect of a nonacknowledgement command (i.e., prevent the tag from asserting a particular session flag or entering the second state). Performing the nonacknowledgement process for a particular tag and a particular session may avoid a reduction in detection rate of the tag and the corresponding increase in undetected transition probability, because the tag remains in the first state and will continue to participate in subsequent inventory rounds for that particular session. However, the nonacknowledgement process also potentially reduces the probability that other, uninventoried tags are inventoried by the reader, because the already-inventoried tag can still participate in subsequent inventory rounds for that particular session and potentially prevent uninventoried tags from responding to the reader. Accordingly, the reader may be configured to use the nonacknowledgement process only for tags associated with items that have relatively high transition risks.

Timing diagram 1550 depicts a nonacknowledgement process that may be used for tags with differing transition risks. Timing diagram 1550 displays the values of S1 flags for tags 1510 and 1512. While S1 flags are used in the following description, in other embodiments other flags (e.g., S0, S2, S3, Select) may be used. In timing diagram 1550, a flag is asserted when its value is high and not asserted when its value is low. The horizontal axis of timing diagram 1550 represents time, with events to the left preceding events to the right.

At initial time 1560, a reader (e.g., read point 1522) may begin a first inventory round (e.g., as described in the Gen2 Specification) by inventorying tags in the first state (i.e., with unasserted S1 flags). For example, the reader may first transmit a query-type command (e.g., as described in the Gen2 Specification) specifying tags with unasserted S1 flags, then continue inventorying the selected tags serially. The reader may be configured to determine the location of a tag while inventorying the tag, for example using AoA or any other suitable location technique. According to timing diagram 1550, both tags 1510 and 1512 are in the first state and have S1 flags that are not asserted, and will participate in the first inventory round. Suppose that the reader first begins to inventory tag 1512. During the inventorying process, the reader may determine that tag 1512 is not located within read zone 1506 or is located within a different read zone. Accordingly, the reader may determine that the item associated with tag 1512 has a relatively low probability or risk of inappropriate transition from space 1502, and may complete the inventorying process by causing tag 1512 to assert its S1 flag and switch to the second state.

The reader may then begin to inventory tag 1510. During the inventorying process, the reader may determine that tag 1510 is located within read zone 1506. Accordingly, the reader may determine that the item associated with tag 1510 has a relatively high probability or risk of inappropriate transition from space 1502, and may modify the inventorying process to prevent tag 1510 from asserting its S1 flag and entering the second state. The reader may modify the inventorying process by not responding to a reply from tag 1510, transmitting a nonacknowledgement command (e.g., a NAK command according to the Gen2 Specification) to tag 1510, or transmitting another command that either prevents tag 1510 from asserting its S1 flag or causes tag 150 to deassert its S1 flag, thereby preventing tag 1510 from switching to the second state.

At time 1562, the reader may perform a second inventory round in which it again attempts to inventory tags in the first state. Tag 1512, having been inventoried at time 1560, is in the second state, and therefore will not respond to reader inventory commands targeting tags in the first state and will not participate in the second inventory round. Tag 1510, on the other hand, is still in the first state due to reader modification of the inventorying process at time 1560, and may therefore respond to reader inventory commands targeting tags in the first state and participate in the second inventory round, resulting in an effective increase in detection rate for tag 1510 as compared to tag 1512. As at time 1560, during the inventorying process at time 1562 the reader may again determine that the item associated with tag 1510 has a relatively high probability or risk of inappropriate transition from space 1502, and accordingly may again modify the inventorying process, preventing tag 1510 from asserting its S1 flag and switching to the second state.

Subsequently, at time 1564, the reader may perform a third inventory round in which it again inventories tags in the first state. At some point between time 1562 and 1564, the S1 flag of tag 1512 may decay to an unasserted state, causing tag 1512 to switch to the first state. As a result, at time 1564 both tags 1510 and 1512 may respond to reader inventory commands targeting tags in the first state and participate in the third inventory round. Similar to time 1560, the reader may determine that the item associated with tag 1512 has a relatively low probability of inappropriate transition, whereas the item associated with tag 1510 has a relatively high probability of unauthorized transition. Accordingly, the reader may cause tag 1512 to switch to the second state and prevent tag 1510 from switching to the second state.

In some embodiments, the reader may use an alternate nonacknowledgement process in which all tags are first inventoried before high-transition-risk tags are separated out. In this process, the reader first inventories all visible (or selected) tags and switches them to the second state. Subsequently, the reader identifies the inventoried tags that have relatively high transition risk and switch those tags back to the first state. The reader then maintains the high-transition-risk tags in the first state using the nonacknowledgement process described herein. The alternate nonacknowledgement process may allow the reader more time to identify high-transition-risk tags, because the reader has to inventory all the tags first, and can therefore determine whether an inventoried tag has a high transition risk without being constrained by protocol timing requirements.

While transition risk is described above in terms of read zones, other parameters may also (or instead) be used to determine transition risk, such as tag distance to exit (determined using AoA, beam identifier, or other location determination techniques), item physical size (smaller items may have relatively higher transition risks and larger items may have relatively lower transition risks), sensitivity (sensitive items, such as dangerous items or items associated with confidential information, may have relatively higher transition risks), value (valuable or expensive items may have relatively higher transition risks), motion (moving tags may have relatively higher transition risks), or any other suitable parameter.

Figure 16:
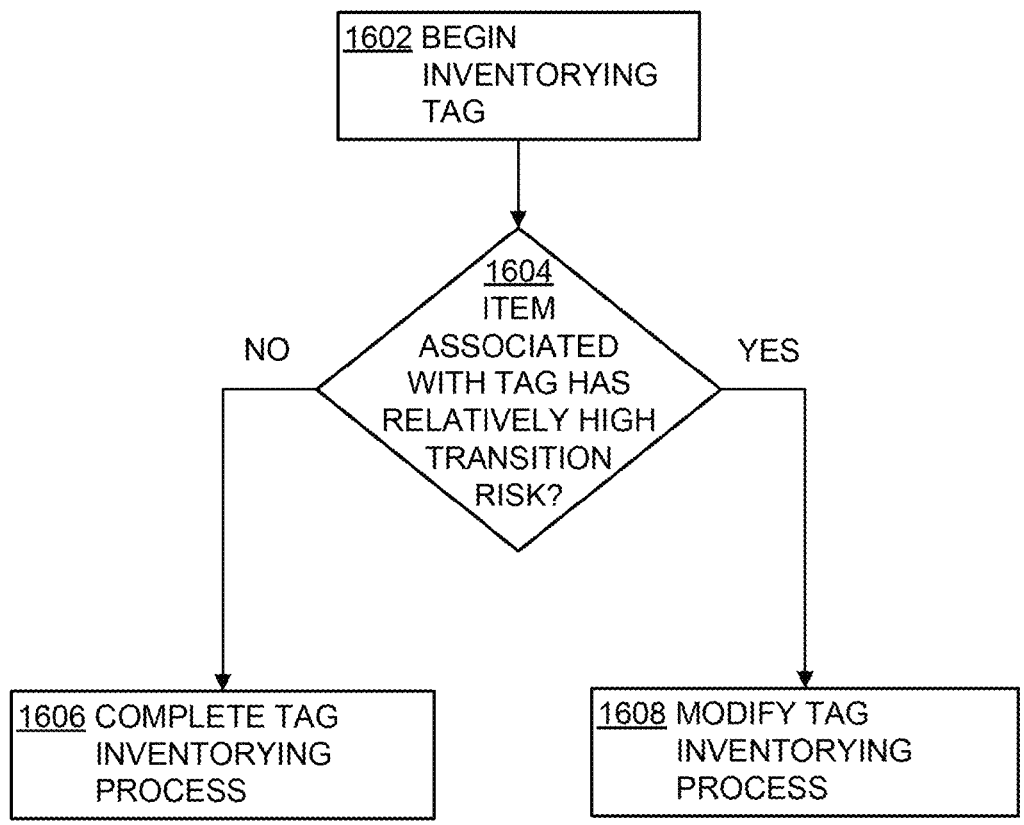
FIG. 16 is a flowchart of an item-monitoring process according to embodiments.

FIG. 16 is a flowchart of an item-monitoring process 1600 according to embodiments. Process 1600 begins at step 1602, where a reader (e.g., a reader in an LPS) begins to inventory a particular tag. At step 1604, the reader evaluates the transition risk of an item associated with the tag, based on tag location, tag identity, tag environment, and/or any other suitable parameter. For example, the reader may determine whether the tag is located in a read zone that is near an exit, entrance, or potential transition point. If so, the reader may determine that the item associated with the tag has a relatively high transition risk. As another example, the reader may determine the item associated with the tag is sensitive, has a small physical size, and/or has relatively high value, as described above. If so, the reader may determine that the item associated with the tag has a relatively high transition risk. As yet another example, the reader may determine whether the tag is in motion. If so, the reader may determine that the item associated with the tag has a relatively high transition risk. In some embodiments, the reader may be configured to derive a quantitative transition risk measurement and compare the measurement to a predefined or dynamic threshold to determine whether the item associated with the tag has a relatively high transition risk.

If the reader determines at step 1604 that the item associated with the tag does not have a relatively high transition risk, at step 1606 the reader may complete the tag inventorying process and cause the tag to assert an associated session flag. For example, the reader may cause the tag to assert a session flag and switch to a second state. On the other hand, if the reader determines at step 1604 that the item associated with the tag does have a relatively high transition risk, at step 1608 the reader may modify the tag inventorying process as described above in FIG. 15 in order to continue detecting the tag at a relatively high rate. For example, the reader may transmit a nonacknowledgement command, may ignore a response from the tag, or may begin the inventorying process anew.

Figure 17:
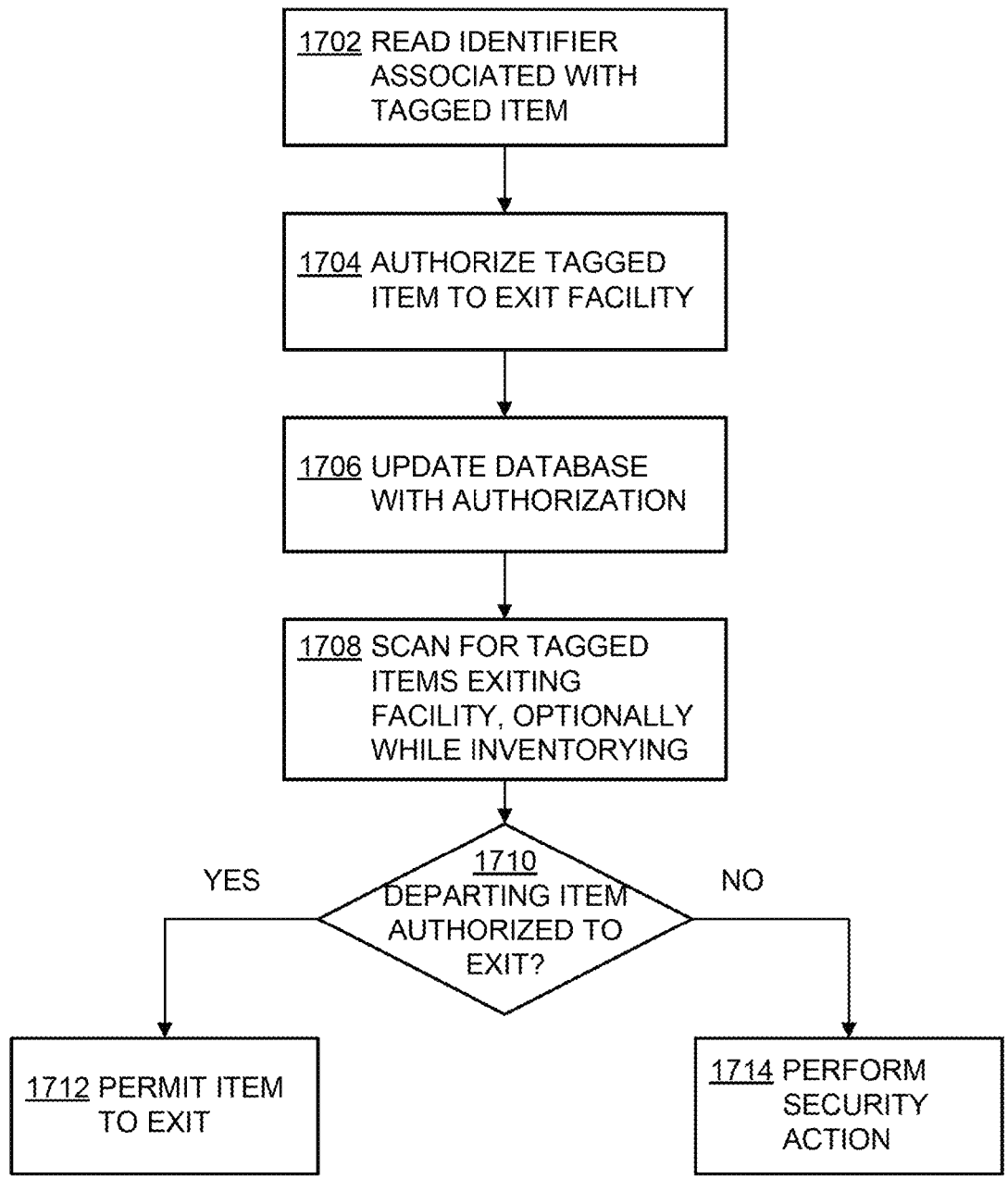
FIG. 17 is a flowchart of a loss-prevention process according to embodiments.

FIG. 17 is a flowchart of a loss-prevention process 1700 according to embodiments. Process 1700 begins at step 1702, where a facility checkout station (e.g., checkout station 1150) reads an identifier from a tag associated with a tagged item. The identifier may be a tag identifier or an item identifier. At step 1704, the checkout station authorizes the tagged item to leave the facility in response to receiving and verifying authorizing information, as described above. The checkout station updates a local or remote database (e.g., database 1160) at step 1706 to indicate that the tagged item is authorized to leave the facility, and may also (or instead) writing data to the tag indicating that it is authorized to leave the facility.

Subsequently, at step 1708 one or more readers scan for tagged items exiting the facility using one or more beams directed at or near facility exits. The reader(s) may scan for tagged items using exit beams (for example, as described in FIG. 11), by determining angles-of-arrival associated with tag replies (for example, as described in FIGS. 12-13), and/or by determining tag presence in read zones (for example, as described in FIGS. 14-15). In some embodiments, the reader(s) may determine that a tag is departing the facility based on its location, its direction-of-travel, and/or its velocity-of-travel. For example, if the reader(s) determines, using exit beam identifiers, read zone identifiers, and/or measured AoAs, that a tag is outside the facility, then it may determine that the tag has departed the facility, especially if the tag is otherwise associated with the facility as described below. As another example, the reader(s) may determine that a tag with a direction-of-travel or velocity-of-travel oriented into or within the facility is not departing and accordingly ignore the tag for exit-tracking purposes, but determine that a tag with a direction-of-travel or velocity-of-travel oriented out of the facility is departing the facility. The reader(s) may scan for tagged items exiting the facility while inventorying tagged items within the facility, as described above.

Upon detecting a tagged item departing the facility (e.g., based on the direction-of-travel, velocity-of-travel, and/or location of the tag associated with the item, as described above), in step 1710 the LPS determines whether the tagged item is authorized to exit the facility. The LPS may retrieve an identifier from the tag associated with the item and compare the identifier to a database or a derived identifier, as described above. In some embodiments, the LPS may also (or instead) retrieve an electronic signature, ticket, and/or exit code or sold code from the tag for use in determining whether the tagged item is authorized to leave the facility. In some embodiments, the LPS may first determine whether the item is associated with the facility. For example, the LPS may determine whether the tag identifier is included in a facility database, or whether an owner code read from the tag is associated with the facility. If not, the LPS may ignore the tag and its associated item. If the LPS determines that the item is associated with the facility and authorized to leave the facility then the LPS permits the item to exit at step 1712.

If the LPS determines that the item is associated with the facility but not authorized to leave then at step 1714 the LPS may perform or initiate a security action. For example, the LPS may issue alert(s), monitor the unauthorized exit, and/or attempt to prevent the unauthorized exit, as described above.

The steps described in processes 1600 and 1700 are for illustration purposes only. Loss prevention may be performed employing additional or fewer steps and in different orders using the principles described herein. The order of the steps may be modified, some steps eliminated, or other steps added according to other embodiments.

As described above, the RF beams for transmitting and/or receiving may be synthesized by an SBR or generated without the use of a synthesized-beam antenna. For example, a transmit beams may be generated by a synthesized-beam antenna but the receive beam may employ a static antenna such a patch, monopole, dipole, etc. As another example, the synthesized beams may be replaced by multiple static antennas coupled to one or more readers.

According to some examples, a method for monitoring RFID-tagged items in a facility is provided. The method may include transmitting a first inventory command configured to cause tags in a first state to participate in a first inventory round and receiving a first reply from a first tag in the first inventory round. The method may further include determining that a first item associated with the first tag has a low transition risk based on the first reply and causing the first tag to switch to a second state based on the low transition risk. The method may further include receiving a second reply from a second tag in the first inventory round, determining that a second item associated with the second tag has a high transition risk based on the second reply, and causing the second tag to remain in the first state based on the high transition risk. The method may further include transmitting a second inventory command configured to cause tags in the first state to participate in a second inventory round, receiving a third reply from the second tag in the second inventory round, determining that the second item has inappropriately exited the facility based on the third reply, and issuing an alert.

According to some embodiments, the method may include determining an item's transition risk based on a physical size and/or a value of the item. Determining that the first item has the low transition risk may include determining that the first item is located within a first zone and/or receiving the first reply on a first beam. Determining that the second item has the high transition risk may include determining that the second item is located within a second zone different from the first zone, determining that the second item is close to an entrance or an exit of the facility, and/or receiving the second reply on a second beam different from the first beam. Determining that the second item has inappropriately exited the facility may include determining that an RF signal of the third reply emanates from outside the facility.

According to other embodiments, causing the second tag to remain in the first state may include transmitting a nonacknowledgement command or not transmitting an acknowledgement command to the second tag. Determining that the second item has inappropriately exited from the facility may include determining that the second item is not on a list of item authorized to leave the facility and/or determining that the second tag does not contain a code indicating that the second item is authorized to leave the facility. Issuing the alert may include activating an alarm, notifying an authority, adjusting a record associated with the second item, and/or writing an alert code to the second tag.

According to other examples, a method for a synthesized-beam radio-frequency identification reader (SBR) to monitor RFID-tagged items in a facility is provided. The method may include synthesizing a first beam directed substantially into the facility, transmitting a first inventory command on the first beam that is configured to cause tags in a first state to participate in a first inventory round, and receiving a first reply from a first tag in the first inventory round. The method may further include determining that a first item associated with the first tag has a low transition risk based on the first reply and causing the first tag to switch to a second state based on the low transition risk. The method may further include receiving a second reply from a second tag in the first inventory round, determining that a second item associated with the second tag has a high transition risk based on the second reply, and causing the second tag to remain in the first state based on the high transition risk. The method may further include synthesizing a second beam directed substantially outside the facility and transmitting a second inventory command on the second beam configured to cause tags in the first state to participate in a second inventory round. The method may further include receiving a third reply from the second tag in the second inventory round, determining that the second item has inappropriately exited the facility based on the third reply, and issuing an alert.

According to some embodiments, determining that the first item has the low transition risk may include determining that a first RF signal of the first reply has a first angle-of-arrival, determining that the first item is located within a first zone, and/or receiving the first reply on a first beam. Determining that the second item has the high transition risk may include determining that a second RF signal of the second reply has a second angle-of-arrival different from the first angle-of-arrival, determining that the second item is located within a second zone different from the first zone, determining that the second item is in proximity to an entrance or an exit of the facility, and/or receiving the second reply on a second beam different from the first beam.

According to other embodiments, the SBR system may include multiple SBRs. The method may include determining an item's transition risk based on a physical size and/or a value of the item. Causing the second tag to remain in the first state may include transmitting a nonacknowledgement command or not transmitting an acknowledgement command to the second tag. Determining that the second item has inappropriately exited from the facility may include determining that the second item is not on a list of item authorized to leave the facility and/or determining that the second tag does not contain a code indicating that the second item is authorized to leave the facility. Issuing the alert may include activating an alarm, notifying an authority, adjusting a record associated with the second item, and/or writing an alert code to the second tag.

According to further examples, a method for a radio-frequency identification (RFID) reader system including multiple antennas to monitor RFID-tagged items in a facility is provided. The method may include directing a first beam substantially into the facility from a first antenna, transmitting a first inventory command on the first beam that is configured to cause tags in a first state to participate in a first inventory round, and receiving a first reply from a first tag in the first inventory round. The method may further include determining that a first item associated with the first tag has a low transition risk based on the first reply and causing the first tag to switch to a second state based on the low transition risk. The method may further include receiving a second reply from a second tag in the first inventory round, determining that a second item associated with the second tag has a high transition risk based on the second reply, and causing the second tag to remain in the first state based on the high transition risk. The method may further include directing a second beam substantially outside the facility from a second antenna and transmitting a second inventory command on the second beam configured to cause tags in the first state to participate in a second inventory round. The method may further include receiving a third reply from the second tag in the second inventory round, determining that the second item has inappropriately exited the facility based on the third reply, and issuing an alert.

According to some embodiments, the reader system may include multiple readers. The method may further include determining an item's transition risk based on a physical size of the item, a value of the item, a zone within which the item is located, and/or a proximity of the item to an entrance and/or an exit of the facility. Causing the second tag to remain in the first state may include transmitting a nonacknowledgement command or not transmitting an acknowledgement command. Determining that the second item has inappropriately exited from the facility may include determining that the second item is not on a list of item authorized to leave the facility and/or determining that the second tag does not contain a code indicating that the second item is authorized to leave the facility. Issuing the alert may include activating an alarm, notifying an authority, adjusting a record associated with the second item, and/or writing an alert code to the second tag.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) system comprising:
   one or more RFID readers, each of the one or more RFID readers configured to wirelessly communicate with RFID tags; and
   a controller communicatively coupled to the one or more RFID readers, wherein the controller comprises a processor block configured to:
      receive, via an RFID reader, a reply from an RFID tag;
      identify, based on at least the received reply, an item associated with the RFID tag;
      determine a characteristic of the item; and
      instruct the RFID reader, based on the determined characteristic, to inventory the RFID tag at a first inventory rate or a second inventory rate different from the first inventory rate.

2. The RFID system of claim 1, wherein the determined characteristic includes one or more of an item identity, an item size, an item value, an item sensitivity, or an item authorization.

3. The RFID system of claim 1, wherein:
   the first inventory rate is higher than the second inventory rate; and
   the processor block is configured to instruct the RFID reader to inventory the RFID tag at the first inventory rate by:
      instructing the RFID reader to transmit a nonacknowledgement (NAK) command, or
      instructing the RFID reader to refrain from transmitting an acknowledgement (ACK) command.

4. The RFID system of claim 1, wherein the RFID reader is a synthesized-beam RFID reader (SBR) capable of generating multiple radio frequency (RF) beams.

5. The RFID system of claim 4, wherein the processor block is configured to instruct the RFID reader to inventory the RFID tag at the first inventory rate by adjusting one or more of:
   the frequency at which the RFID reader uses beams oriented toward a location of the RFID tag for inventorying, or
   a duration of beams oriented toward the location of the RFID tag.

6. The RFID system of claim 1, wherein the processor block is further configured to instruct the RFID reader to:
   cause the RFID tag to participate in a subsequent inventory round or to refrain from participating in the subsequent inventory round based on the determined characteristic of the item.

7. A Radio Frequency Identification (RFID) system comprising:
   one or more RFID readers, each of the one or more RFID readers configured to wirelessly communicate with RFID tags; and
   a controller communicatively coupled to the one or more RFID readers, wherein the controller comprises a processor block configured to:
      receive, via an RFID reader, a reply from an RFID tag;

determine, based on at least the received reply, a location of the RFID tag; and if the location of the RFID tag is a first location, then instruct the RFID reader to inventory the RFID tag at a first inventory rate, else instruct the RFID reader to inventory the RFID tag at a second inventory rate different from the first inventory rate.

8. The RFID system of claim 7, wherein the processor block is configured to determine the location of the RFID tag based on at least a first angle-of-arrival of the received reply and a second angle-of-arrival of another received reply.

9. The RFID system of claim 7, wherein the processor block is configured to determine the location of the RFID tag based on one or more of a tag read count or a tag read rate.

10. The RFID system of claim 7, wherein:
the first inventory rate is higher than the second inventory rate; and
the processor block is configured to instruct the RFID reader to inventory the RFID tag at the first inventory rate by:
instructing the RFID reader to transmit a nonacknowledgement (NAK) command, or
instructing the RFID reader to refrain from transmitting an acknowledgement (ACK) command.

11. The RFID system of claim 7, wherein the RFID reader is a synthesized-beam RFID reader (SBR) capable of generating multiple radio frequency (RF) beams.

12. The RFID system of claim 11, wherein the processor block is configured to instruct the RFID reader to inventory the RFID tag at the first inventory rate by adjusting one or more of:
the frequency at which the RFID reader uses beams oriented toward the location of the RFID tag for inventorying, or
a duration of beams oriented toward the location of the RFID tag.

13. A Radio Frequency Identification (RFID) reader comprising:
a front-end module to interface with one or more reader antennas; and
a processor block coupled to the front-end module and configured to:
receive, via the front-end module, a reply from an RFID tag participating in an inventory round;
identify, based on at least the received reply, an item associated with the RFID tag;
determine one or more of a characteristic of the item and a location of the item; and
inventory the RFID tag, based on the determination, at a first inventory rate or a second inventory rate different from the first inventory rate.

14. The RFID reader of claim 13, wherein the characteristic includes one or more of an item identity, an item size, an item value, an item sensitivity, or an item authorization.

15. The RFID reader of claim 13, wherein the processor block is configured to determine the location of the item based on at least a first angle-of-arrival of the received reply and a second angle-of-arrival of another received reply.

16. The RFID reader of claim 13, wherein the processor block is configured to determine the location of the item based on one or more of a tag read count or a tag read rate.

17. The RFID reader of claim 13, wherein the processor block is further configured to:
cause the RFID tag to participate in a subsequent inventory round or to refrain from participating in the subsequent inventory round based on the determined characteristic and/or the location of the item.

18. The RFID reader of claim 13, wherein:
the first inventory rate is higher than the second inventory rate; and
the processor block is configured to inventory the RFID tag at the first inventory rate by:
transmitting, through the front-end module, a nonacknowledgement (NAK) command, or
refraining from transmitting, through the front-end module, an acknowledgement (ACK) command.

19. The RFID reader of claim 13, wherein the RFID reader is a synthesized-beam RFID reader (SBR) capable of generating multiple radio frequency (RF) beams.

20. The RFID reader of claim 19, wherein the processor block is configured to inventory the RFID tag at the first inventory rate by adjusting one or more of:
the frequency at which the RFID reader uses beams oriented toward the location of the item for inventorying, or
a duration of beams oriented toward the location of the item.

* * * * *

UNITED STATES PATENT AND TRADEMARK OFFICE
CERTIFICATE OF CORRECTION

PATENT NO. : 11,017,349 B1
APPLICATION NO. : 16/728480
DATED : May 25, 2021
INVENTOR(S) : Christopher J. Diorio et al.

Page 1 of 1

It is certified that error appears in the above-identified patent and that said Letters Patent is hereby corrected as shown below:

On the Title Page

Item (74), Column 2 (Attorney Agent, or Firm), Line 1, Delete "Turk" and insert -- Turk, --, therefor.

In the Specification

In Column 7, Line 66, Delete "referred-to" and insert -- referred to --, therefor.

In Column 31, Line 11, Delete "anew." and insert -- a new. --, therefor.

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*